United States Patent
Nishimura et al.

(10) Patent No.: US 10,956,765 B2
(45) Date of Patent: Mar. 23, 2021

(54) INFORMATION PROCESSING DEVICE AND INFORMATION PROCESSING METHOD

(71) Applicant: SONY CORPORATION, Tokyo (JP)

(72) Inventors: Kohei Nishimura, Tokyo (JP); Shinichiro Chikada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 16/321,509

(22) PCT Filed: Jun. 19, 2017

(86) PCT No.: PCT/JP2017/022433
§ 371 (c)(1),
(2) Date: Jan. 29, 2019

(87) PCT Pub. No.: WO2018/034052
PCT Pub. Date: Feb. 22, 2018

(65) Prior Publication Data
US 2019/0164000 A1    May 30, 2019

(30) Foreign Application Priority Data

Aug. 19, 2016   (JP) .............................. JP2016-161460

(51) Int. Cl.
*G06K 9/22* (2006.01)
*G06T 11/60* (2006.01)
(Continued)

(52) U.S. Cl.
CPC ......... *G06K 9/222* (2013.01); *G06F 3/03545* (2013.01); *G06F 3/0488* (2013.01);
(Continued)

(58) Field of Classification Search
None
See application file for complete search history.

(56) References Cited

U.S. PATENT DOCUMENTS 5,913,221 A      6/1999 Kano et al.
2012/0317108 A1*  12/2012 Okazaki .............. G06F 3/04815
                                                  707/732

(Continued)

FOREIGN PATENT DOCUMENTS

GB    2274186 A    7/1994
JP    64-41081 A   2/1989
(Continued)

OTHER PUBLICATIONS mindmapsunleashed.com (How to create a Digital Mind Map in 3 simple steps, https://mindmapsunleashed.com/how-to-create-a-digital-mind-map archived by Internet archive wayback machine on Jul. 3, 2016) (Year: 2016).*

(Continued)

*Primary Examiner* — Randolph I Chu
(74) *Attorney, Agent, or Firm* — Chip Law Group

(57) ABSTRACT

An information processing device, including an acquiring unit that acquires relationship information indicating a relationship between a plurality of first objects indicated by symbols input by a user, and a file control unit that generates (Continued)

display information related to display of second objects including position information indicating positions of the second objects corresponding to the first objects in a document file on the basis of the relationship information.

17 Claims, 23 Drawing Sheets

(51) Int. Cl.

| | | |
|---|---|---|
| *G06F 40/166* | (2020.01) | |
| *G06F 40/171* | (2020.01) | |
| *G06F 3/0488* | (2013.01) | |
| *G06F 3/0354* | (2013.01) | |
| *G06F 9/50* | (2006.01) | |

(52) U.S. Cl.
CPC .......... *G06F 9/5038* (2013.01); *G06F 40/166* (2020.01); *G06F 40/171* (2020.01); *G06T 11/60* (2013.01)

(56) References Cited

U.S. PATENT DOCUMENTS

| | | | |
|---|---|---|---|
| 2017/0109032 A1* | 4/2017 | MeLinand | G06K 9/00436 |
| 2017/0109578 A1* | 4/2017 | Bednarowicz | G06F 40/205 |
| 2017/0109579 A1* | 4/2017 | MeLinand | G06K 9/00476 |
| 2019/0095395 A1* | 3/2019 | Piecko | G06F 16/2457 |

FOREIGN PATENT DOCUMENTS

| | | |
|---|---|---|
| JP | 64-041081 A | 2/1989 |
| JP | 06-208654 A | 7/1994 |
| JP | 09-245186 A | 9/1997 |
| JP | 2011-113433 A | 6/2011 |

OTHER PUBLICATIONS xslab.com (10 Great Mind Mapping Apps for Android, https://xslab.com/2014/02/10-great-mind-mapping-apps-for-android/, Feb. 19, 2014). (Year: 2014).* mindmeister.com ("How Can I Print a Mind Map on Multiple Pages?", https://support.mindmeister.com/hc/en-us/articles/201210746-How-Can-I-Print-a-Mind-Map-on-Multiple-Pages-, Feb 18, 2015). (Year: 2015).*

Malmi et al., "Beyond rankings: comparing directed acyclic graphs", Data Mining and Knowledge Discovery • Mar. 2015 (Year: 2015).*

International Search Report and Written Opinion of PCT Application No. PCT/JP2017/022433, dated Aug. 8, 2017, 10 pages of ISRWO.

Office Action for JP Patent Application No. 2018-534281, dated Oct. 20, 2020, 03 pages of Office Action and 02 pages of English Translation.

* cited by examiner

| INPUT SYMBOL | RELATIONSHIP INFORMATION | INPUT SYMBOL | RELATIONSHIP INFORMATION |
|---|---|---|---|
|  | RESULTATIVE, SUBJECT AND PREDICATE |  | PARADOX |
|  | CONCLUSION |  | CONVERSION |
|  | MATERIAL CONDITIONAL |  | AGGREGATION |
|  | EQUIVALENT, PARAPHRASE |  | ILLUSTRATION, INCLUSION |
|  | ENUMERATION |  | OTHER RELATIONSHIPS |
|  | ARRANGED IN SAME PAGE |  | ARRANGED IN ANOTHER PAGE |

FIG. 7
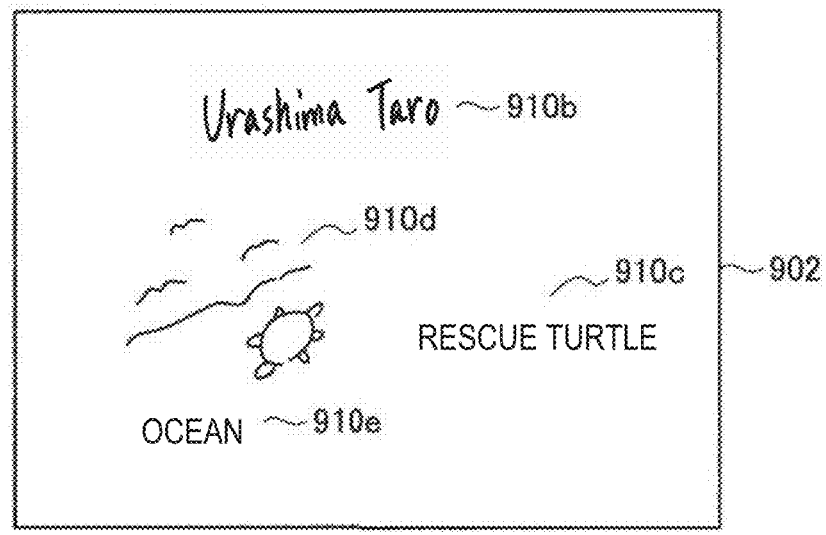

FIG. 10
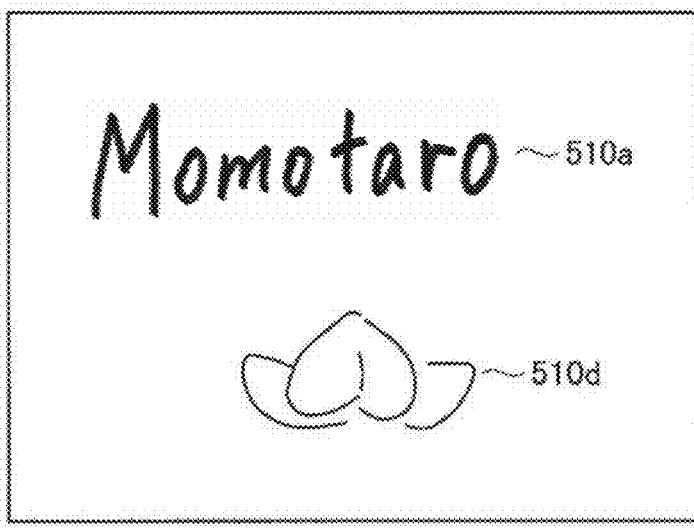
~510a
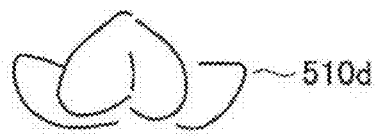
~510d
501
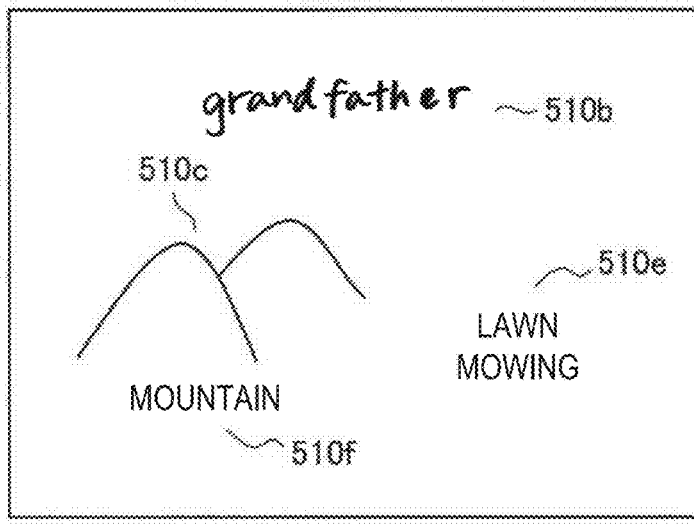
~510b
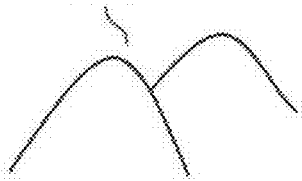
510c
~510e
LAWN
MOWING
502
MOUNTAIN
~510f
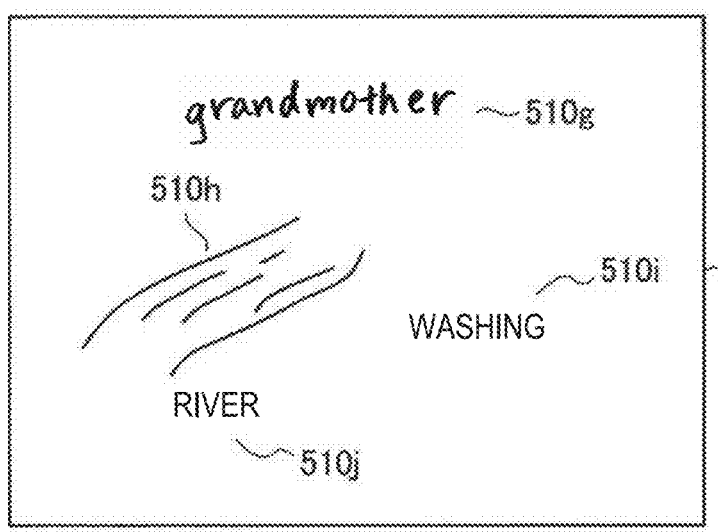
~510g
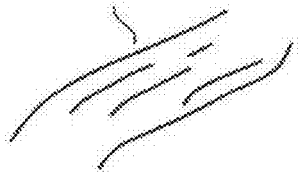
510h
~510i
WASHING
503
RIVER
~510j

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/022433 filed on Jun. 19, 2017, which claims priority benefit of Japanese Patent Application No. JP 2016-161460 filed in the Japan Patent Office on Aug. 19, 2016. Each of the above-referenced applications is hereby incorporated herein by reference in its entirety.

TECHNICAL FIELD

The present disclosure relates to an information processing device, an information processing method, and a program.

BACKGROUND ART

In recent years, in various scenes represented by business scenes, document files have been used as an information transfer medium. For such a document file, in order to generate desired display information as display information related to display of an object included in the file, there are cases in which it takes time and effort to input much information. In this regard, a technique for improving efficiency of generation of desired display information for an object in a document file has been proposed.

For example, a technique for a device including a feature quantity calculation unit that receives learning data that is accumulated such that a differential feature quantity which is a difference between slides of feature quantities of slides whose slide order is known and a classification result indicating an anteroposterior relation of a slide corresponding to the difference feature quantity are learned and a new slide whose slide order is unknown and calculates a feature quantity of the new slide in order to automatically prepare a presentation material from slides whose content or order is not arranged, a differential feature quantity calculation unit that calculates a differential feature quantity between new slides, a classification unit that receives the differential feature quantity between the new slides and outputs a classification result corresponding to the differential feature quantity from the learning data, and a new slide order deciding unit that decides an order of the new slide on the basis of the anteroposterior relation of the slide indicated by the classification result has been proposed in Patent Literature 1.

CITATION LIST

Patent Literature

Patent Literature 1: JP 2011-113433A

DISCLOSURE OF INVENTION

Technical Problem

However, in the field related to document files, it is considered to be desirable to make generation of desired display information for an object in the file more efficient. Specifically, in order to generate desired display information, it may take time and effort to input much information as described above. Such time and effort become particularly noticeable, for example, in a case in which respective objects are rearranged after a file is temporarily generated as a draft or in a case in which a user is not accustomed to generation of display information.

In this regard, the present disclosure proposes an information processing device, an information processing method, and a program which are novel and improved and capable of generating desired display information related to an object in a document file more efficiently.

Solution to Problem

According to the present disclosure, there is provided an information processing device, including: an acquiring unit configured to acquire relationship information indicating a relationship between a plurality of first objects indicated by symbols input by a user; and a file control unit configured to generate display information related to display of second objects including position information indicating positions of the second objects corresponding to the first objects in a document file on the basis of the relationship information.

In addition, according to the present disclosure, there is provided an information processing method, including: acquiring relationship information indicating a relationship between a plurality of first objects indicated by symbols input by a user; and generating, by an information processing device, display information related to display of second objects including position information indicating positions of the second objects corresponding to the first objects in a document file on the basis of the relationship information.

In addition, according to the present disclosure, there is provided a program causing a computer to function as: an acquiring unit configured to acquire relationship information indicating a relationship between a plurality of first objects indicated by symbols input by a user; and a file control unit configured to generate display information related to display of second objects including position information indicating positions of the second objects corresponding to the first objects in a document file on the basis of the relationship information.

Advantageous Effects of Invention

As described above, according to the present disclosure, it is possible to generate desired display information related to an object in a document file more efficiently.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an explanatory diagram illustrating an example of a data table in which input symbols and relationship information are associated.

FIG. 7 is an explanatory diagram illustrating an example of a reference document file stored in a storage unit in advance.

FIG. 10 is an explanatory diagram illustrating an example of a document file generated by a file generating unit.

MODE(S) FOR CARRYING OUT THE INVENTION

Figure 1:
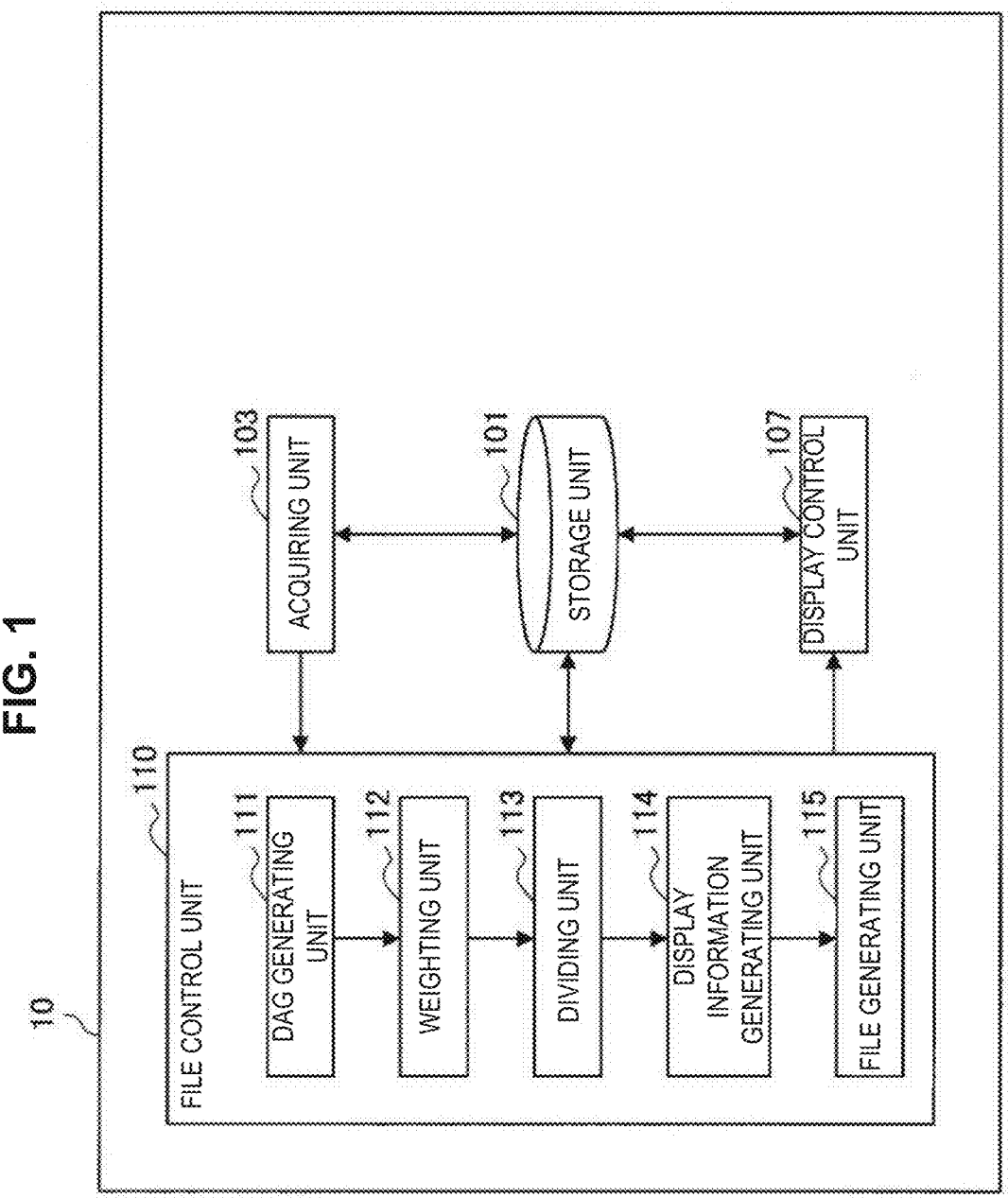
FIG. 1 is an explanatory diagram illustrating an example of a functional configuration of an information processing device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Information processing device
1-1. Functional configuration
1-1-1. Storage unit
1-1-2. Acquiring unit
1-1-3. File generating unit
1-1-4. Display control unit
1-2. Operation
2. Modified examples
2-1. First modified example
2-2. Second modified example
2-3. Third modified example
3. Hardware configuration
4. Conclusion

1. INFORMATION PROCESSING DEVICE

First, a functional configuration and an operation of an information processing device 10 according to an embodiment of the present disclosure will be described with reference to FIGS. 1 to 18. The information processing device 10 according to the present embodiment generates a document file desired by a user on the basis of information input by the user. The information processing device 10 may be implemented, for example, as a user terminal used by the user. Specifically, respective functions of the user terminal serving as the information processing device 10 can be realized by a device such as a personal computer, a smartphone, a tablet terminal, or the like. Hereinafter, an example in which the information processing device 10 is implemented as the user terminal will be mainly described.

[1-1. Functional Configuration]

FIG. 1 is an explanatory diagram illustrating an example of a functional configuration of the information processing device 10 according to the present embodiment. As illustrated in FIG. 1, the information processing device 10 includes a storage unit 101, an acquiring unit 103, a file control unit 110, and a display control unit 107.

(1-1-1. Storage Unit)

The storage unit 101 stores data which is referred to for various kinds of processes performed by the information processing device 10. Specifically, the storage unit 101 stores a data table T10 used in an input information acquisition process performed by the acquiring unit 103. Further, the storage unit 101 also stores a reference directed acyclic graph (reference DAG) and a reference document file used in a weighting process or a display information generation process performed by the file control unit 110. Further, the storage unit 101 may store the directed acyclic graph (DAG) and the document file generated by the file control unit 110. Specifically, the DAG and the document file are associated and stored in the storage unit 101.

(1-1-2. Acquiring Unit)

The acquiring unit 103 acquires various kinds of information used for a process performed by the information processing device 10. Further, the acquiring unit 103 outputs various kinds of information to the file control unit 110 and the storage unit 101. Specifically, the acquiring unit 103 acquires information indicating an input object to be described later, relationship information, and attribute information as information mainly used in a document file generation process performed by the file control unit 110.

Here, specifically, the information processing device 10 is configured integrally with an input device that receives an input of the user. Further, the information processing device 10 may be configured separately from the input device. In this case, the information processing device 10 is configured to be able to communicate with the input device. Input of information from the user to the information processing device 10 can be realized through such an input device. Specifically, a device that can receive an input of a handwriting manipulation of the user can be applied as the input device. Further, specifically, the information processing device 10 is configured integrally with a display device which displays various screens. Further, the information processing device 10 may be configured separately from the display device. In this case, the information processing device 10 is configured to be able to communicate with the display device. Control of display of a screen by the information processing device 10 can be realized by such a display device. The input device and the display device may be configured integrally, and functions of the input device and the display device may be realized by, for example, a touch panel.

The information processing device 10 includes the display control unit 107 for controlling display of various screens as will be described later. The display of various screens by the display device is controlled by the display control unit 107. For example, the display control unit 107 may cause the display device to display an input window including information input to the information processing device 10 in an input process by the user.

Figure 2:
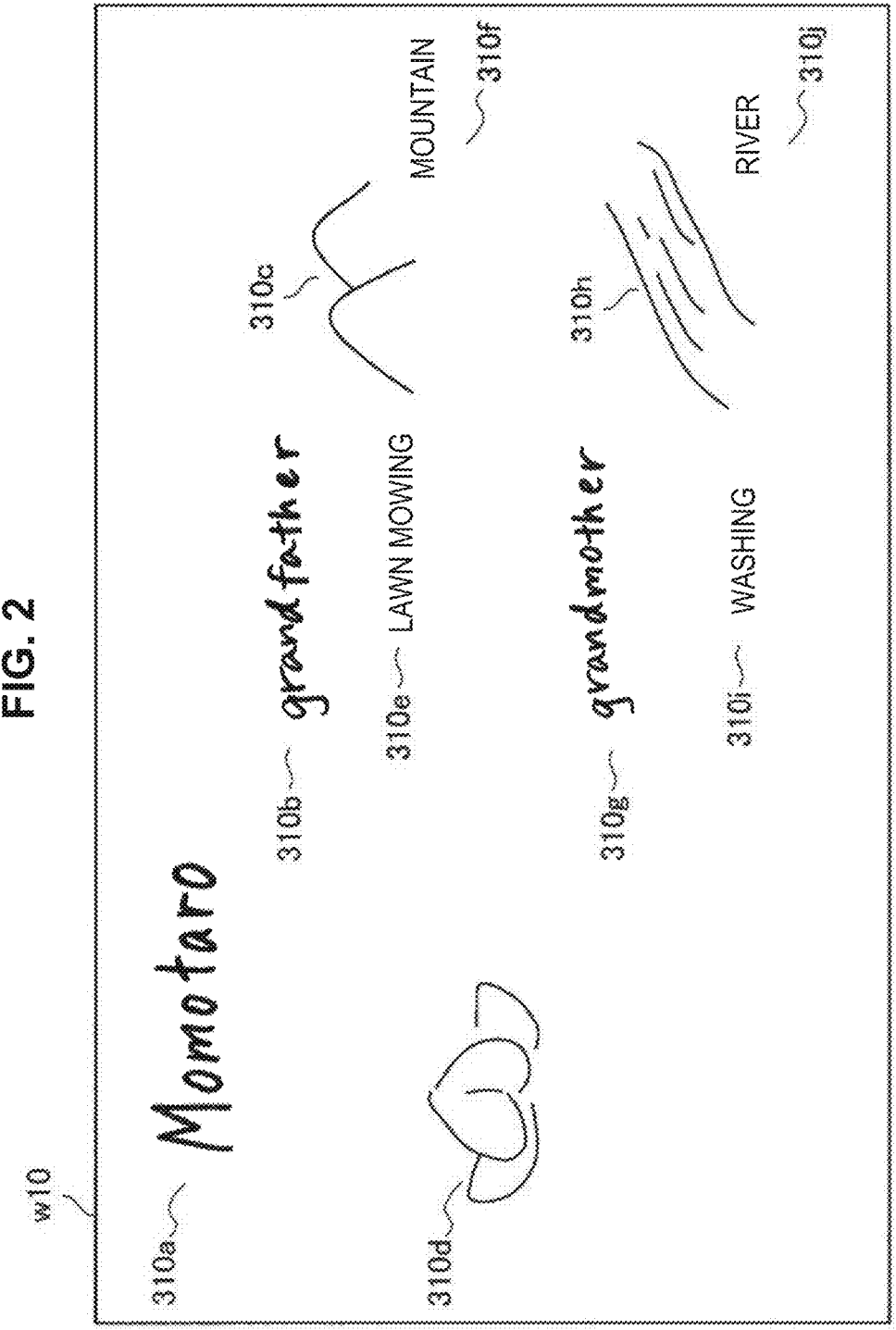
FIG. 2 is an explanatory diagram illustrating an example of an input window displayed by an information processing device according to the embodiment.
Figure 3:
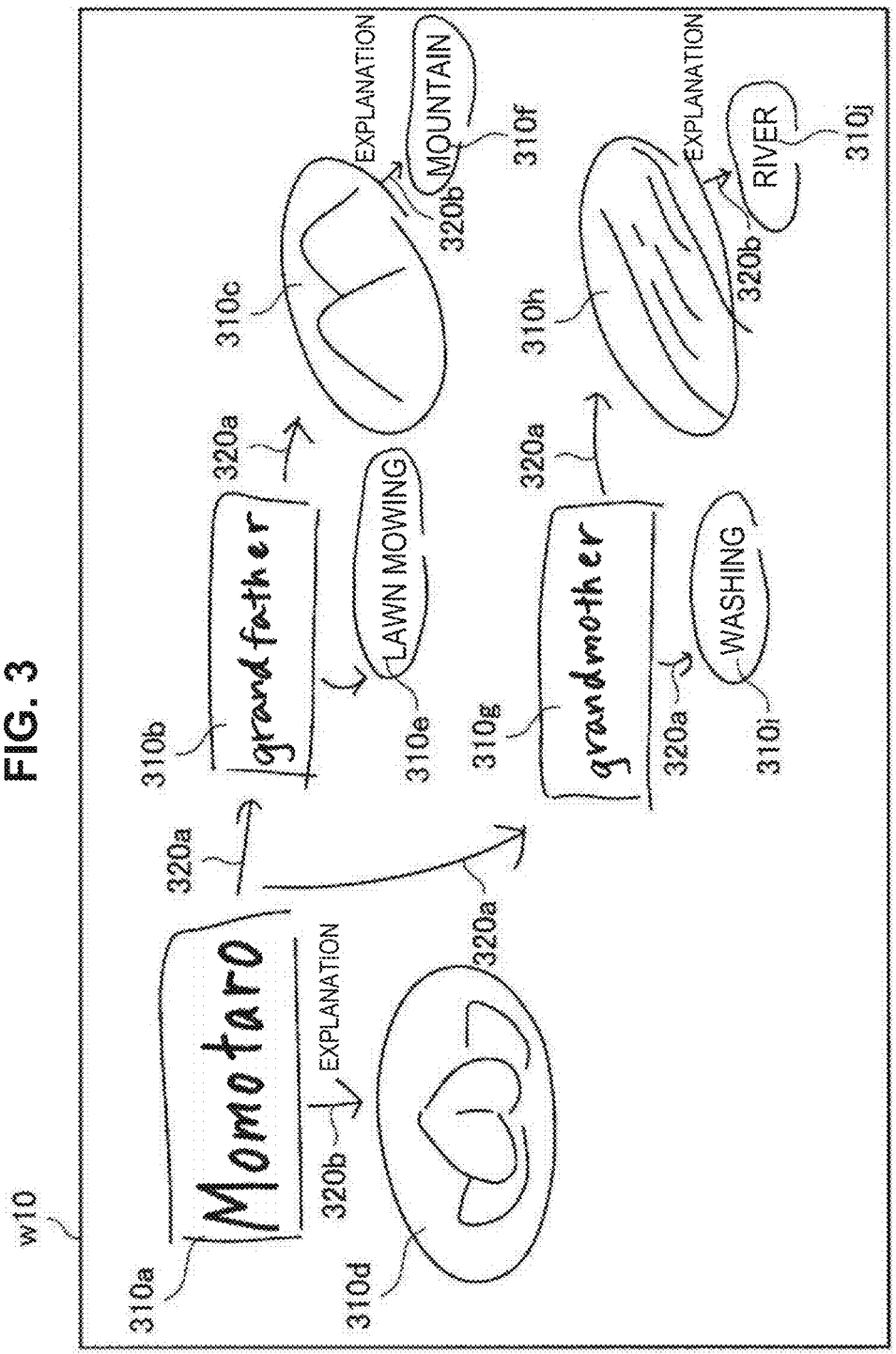
FIG. 3 is an explanatory diagram illustrating an example of an input window displayed by an information processing device according to the embodiment.

Here, the input process by the user will be described with reference to a specific example of the input window illustrated in FIG. 2 and FIG. 3. FIGS. 2 and 3 are explanatory diagrams illustrating an example of an input window W10 displayed by the information processing device 10 according to the present embodiment.

First, the user inputs a plurality of objects. Hereinafter, the object input by the user is referred to as an input object. The input object corresponds to a first object according to the present disclosure. The input object may be input by a handwriting manipulation. Input of an input object 310 by a handwriting manipulation can be realized by applying a touch pad, a pen type device capable of receiving a handwriting manipulation, or the like as the input device of the information processing device 10. Further, the input object may be stored in the storage unit 101 in advance, and in this case, the input object may be input by a drag manipulation or the like.

FIG. 2 specifically illustrates the input window W10 after the input object 310 is input. In the input window W10 after the input object 310 is input, for example, a plurality of input objects 310 is illustrated as illustrated in FIG. 2. Further, in FIG. 2, letters are appended to the ends of reference numerals of the input objects 310 to distinguish the respective input objects 310. Specifically, input objects 310*a*, 310*b*, and 310*g* are objects of handwriting stroke. Further, the input objects 310*a*, 310*b*, and 310*g* indicate Momotaro, grandfather, and grandmother, respectively. In FIG. 2, a person's name "Momotaro" is written in the input object 310*a* by handwriting, and a noun "grandfather" indicating a grandfather is written in the input object 310*b* by handwriting, and a noun "grandmother" indicating a grandmother is written in the input object 310*g* by handwriting. Further, input objects 310*c*, 310*d* and 310*h* are objects of images. The input objects 310*c*, 310*d*, and 310*h* indicate a mountain, a peach, and a river, respectively. Further, input objects 310*e*, 310*f*, 310*i*, and 310*j* are objects of text. Further, the input objects 310*e*, 310*f*, 310*i*, 310*j* indicate lawn mowing, a mountain, washing, and a river, respectively.

The types of the input objects 310 illustrated in FIG. 2 are merely examples of the types of input objects which can be input. For example, objects of an image, a moving image, a figure, a table, or a graph can be applied as the input objects.

The acquiring unit 103 can acquire information indicating each input object 310 through the input device of the information processing device 10.

Next, the user inputs a symbol indicating a relationship between a plurality of input objects. Hereinafter, the symbol input by the user is referred to as an input symbol. The input symbol corresponds to a symbol according to the present disclosure. The input symbol may be input by a handwriting manipulation. Accordingly, the input symbol can be input intuitively and easily. Input of an input symbol by a handwriting manipulation can be realized by applying a touch pad, a pen type device capable of receiving a handwriting manipulation, or the like as the input device of the information processing device 10. Further, the input symbol may be stored in the storage unit 101 in advance, and in this case, the input symbol may be input by a drag manipulation or the like.

FIG. 3 specifically illustrates the input window W10 after arrows are input as the input symbol. In the input window W10 after an arrow 320 is input, for example, a plurality of arrows 320 is illustrated as illustrated in FIG. 3. Further, in FIG. 3, letters are appended to the ends of reference numerals of the arrows 320 to distinguish the respective arrows 320. The arrow 320 is input and displayed to connect two input objects 310. Accordingly, the arrow 320 indicates a relationship between the two input objects 310. Specifically, the arrow 320*a* indicates that there is an order relation between corresponding two input objects 310. Further, the arrow 320*a* indicates the order relation that the input object 310 on the side indicated by the arrow 320*a* is later than the input object 310 on the other side. Further, the arrow 320*b* is an arrow having a letter "explanation" appended thereto and indicates that there is an explanatory relationship between corresponding two input objects 310. Further, the arrow 320*b* indicates that the input object 310 on the side indicated by the arrow 320*b* explains the input object 310 on the other side.

The arrows 320 illustrated in FIG. 3 are merely examples of the input symbols which can be input. For example, a logical symbol or a connection symbol used in a unified modeling language (UML) diagram can be applied as the input symbol. Here, a specific example of the input symbol will be described with reference to FIG. 4. FIG. 4 is an explanatory diagram illustrating an example of the data table T10 in which each input symbol is associated with each piece of relationship information indicating a relationship between a plurality of input objects 310 indicated by the respective input symbols.

As illustrated in FIG. 4, various symbols can be applied as the input symbol. In FIG. 4, an adjacent input symbol and the relationship information in the same line are associated. Specifically, the input symbol and the relationship information positioned on the right of the input symbol in the same line are associated. As the relationship information corresponding to each input symbol, specifically, as illustrated in FIG. 4, resultative, master and servant, conclusion, material conditional, equivalent, paraphrase, enumeration, paradox, conversion, aggregation, illustration, inclusion, or other relationships may be applied. Further, information indicating a relationship positioned on the same page in a document file generated by the information processing device 10 or a relationship positioned in a separate page may be applied as the relationship information as illustrated in a bottom line of the data table T10 of FIG. 4. Further, different relationship information may be associated with input symbols having different sizes or colors. Here, the input symbol may have a color as a setting item, and the color of the input symbol may be set by various manipulations using the input device. Further, the relationship information is not limited to the example indicating a relationship between two input objects 310 and may indicate a relationship between three or more input objects 310.

The acquiring unit 103 can acquire information indicating each input symbol through the input device of the information processing device 10. Then, for example, the acquiring unit 103 can perform image processing on the information and acquire each input symbol and corresponding relationship information with reference to the data table T10 stored in the storage unit 101. As described above, the acquiring unit 103 acquires the relationship information indicating a relationship between a plurality of input objects 310 indicated by the input symbols input by the user.

Then, the user may input attribute information indicating an attribute of the input object 310. Examples of the attribute include a type, a generated time, an edited time, a person who generated it, a person who edited it, a dimension, a position in the input window W10, a degree of importance, and a role in an object to be generated.

The attribute information can be input by various manipulations using the input device of the information processing device 10. For example, the attribute information indicating the dimension of the input object 310 or the position in the input window W10 can be input by a manipulation such as drag, pinch in, or pinch out.

Further, attribute information may be input by a manipulation using a menu displayed on the display device. The information processing device 10 may cause the display device to display a menu used when the user inputs various kinds of information. Specifically, in a case in which one or more input objects 310 in the input window W10 are selected, the information processing device 10 may cause a menu for inputting various kinds of attribute information related to the selected input object 310 to be displayed. For example, such a menu may be a menu in which it is possible to input the presence or absence of attribute information indicating degree of importance. Further, such a menu may be configured such that attribute information indicating a degree of importance can be input stepwise (for example, in five steps) in accordance with an importance. Further, such a menu may be configured such that attribute information indicating a role in an object to be generated can be input by a form of selecting one or more from a plurality of choices. A role such as subject, argument, conclusion, supplement, or the like can be applied as the choice.

Further, the attribute information may be input by appropriately setting a setting item of the input object 310. Here, the input object 310 may have a color or a dimension as the setting item, and the color or the dimension of the input object 310 may be set by various manipulations using the input device. For example, attribute information indicating a relatively high degree of importance may be input by setting the color of input object 310 to red. Further, attribute information indicating a relatively low degree of importance may be input by setting the color of the input object 310 to a pale color.

Further, the attribute information may be input by inputting a figure, a character, or the like to a position corresponding to the input object 310 in the input window W10. Specifically, such a figure, character, or the like can be input by a handwriting manipulation. For example, attribute information indicating a relatively high degree of importance may be input by inputting a mark such as a star mark, a check mark, or the like, or a world "important" in the vicinity of the input object 310 in the input window W10. Further, attribute information indicating a degree of importance may be input in five steps by inputting any one of numbers 1 to 5 or any letter of A to E in the vicinity of the input object 310 in the input window W10. Further, attribute information indicating a subject as a role may be input by inputting an underline to the input object 310 in the input window W10. Further, attribute information indicating argument as a role may be input by inputting a substantially circular or substantially elliptical frame surrounding the input object 310 in the input window W10. Further, attribute information indicating conclusion as a role may be input by inputting a substantially rectangular frame surrounding the input object 310 in the input window W10. Further, attribute information indicating theme, argument, or conclusion as a role may be input by inputting a word "theme," "argument," or "conclusion" in the vicinity of the input object 310 in the input window W10. Further, in a case in which the attribute information is input by inputting the figure, character, or the like, a plurality of figures, characters, or the like may be input to one input object 310.

The information processing device 10 may be able to switch between a mode in which the input of the attribute information by the input of a figure, a character, or the like can be received and a mode in which such an input of the attribute information is unable to be received. The mode switching can be performed, for example, in accordance with an input manipulation of the user. Further, the input of the attribute information may be realized by using a pen type device or the like capable of receiving the input of the attribute information by the input of the figure, character, or the like as the input device.

Further, information indicating that an object corresponding to the input object 310 is not included in a generated document file may be input by inputting a cross mark or a double line to the input object 310 in the input window W10. In this case, the file control unit 110 generates a document file not including the object corresponding to the input object 310 in the document file generation process to be described later.

The acquiring unit 103 can acquire the attribute information through the input device of the information processing device 10. Further, a case in which the attribute information indicating the type of the input object 310, the generated time, the edited time, the person who generated it, or the person who edited it is added to the information indicating the input object 310 is considered. In this case, the acquiring unit 103 may acquire the attribute information when the information indicating the input object 310 is acquired. Further, the acquiring unit 103 may acquire the attribute information indicating the degree of importance or the role in the generated object by performing estimation on the basis of the attribute information indicating the dimension of the input object 310 or the position in the input window W10.

Further, the example in which the input object 310, the arrow 320, and the attribute information are sequentially input in the input process by the user has been described above in order to facilitate understanding, but the input order of various kinds of information is not limited to this example.

Further, in a case in which a frame surrounding each input object 310 is input by the user, the information processing device 10 may cause a frame surrounding each input object 310 to be displayed in the input window W10 as illustrated in FIG. 3. In a case in which the frame is input, the information processing device 10 may recognize that the input object 310 corresponding to the frame is connected to the arrow 320.

(1-1-3. File Control Unit)

The file control unit 110 illustrated in FIG. 1 generates a document file on the basis of information input by the user. Specifically, the file control unit 110 generates the document file on the basis of various kinds of information output from the acquiring unit 103. The file control unit 110 according to the present embodiment generates display information related to display of an output object including position information indicating positions of the input object 310 and a corresponding output object in the document file on the basis of the relationship information. The output object is an object included in the generated document file and corresponds to a second object according to the present disclosure. Specifically, the file control unit 110 generates the display information using the DAG. The file control unit 110 includes a DAG generating unit 111, a weighting unit 112, a dividing unit 113, a display information generating unit 114, and a file generating unit 115, for example, as illustrated in FIG. 1.

(DAG Generating Unit)

The DAG generating unit 111 generates a DAG by modeling a relationship between a plurality of input objects 310 indicated by the relationship information. Further, the DAG generating unit 111 outputs information indicating the generated DAG to the weighting unit 112.

Figure 5:
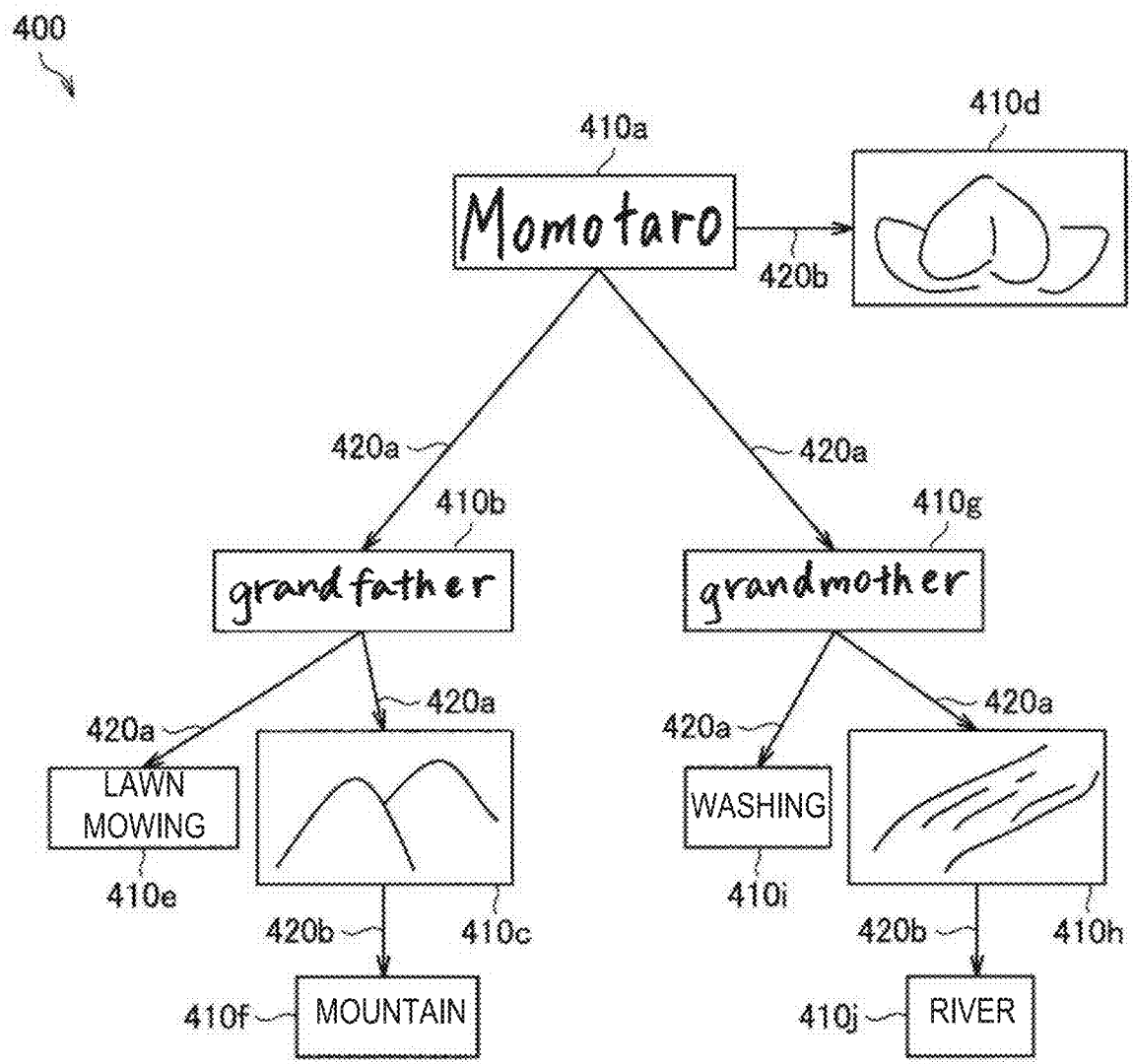
FIG. 5 is an explanatory diagram illustrating an example of a directed acyclic graph (DAG) generated by a DAG generating unit.

FIG. 5 is an explanatory diagram illustrating an example of a DAG 400 generated by the DAG generating unit 111. Specifically, FIG. 5 illustrates the generated DAG 400 in a case in which each input object 310 and each arrow 320 displayed in the input window W10 illustrated in FIG. 3 are input by the user. The DAG generating unit 111 generates the DAG 400, for example, by generating a node 410 corresponding to each input object 310 and an edge 420 corresponding to each arrow 320. Further, in FIG. 5, letters are appended to the ends of reference numerals of the nodes 410 to distinguish the respective nodes 410. Further, letters are appended to the end of reference numerals of the edges 420 to distinguish the respective edges 420.

In FIG. 5, display content of the input objects 310 corresponding to the respective nodes 410 is schematically illustrated. Nodes 410*a* to 410*j* correspond to the input objects 310*a* to 310*j*, respectively. Further, edges 420*a* and 420*b* correspond to the arrows 320*a* and 320*b*, respectively. Specifically, the DAG generating unit 111 generates the edge 420 so as to connect two input objects 310 whose relationship is indicated by each arrow 320 with two corresponding nodes 410. Accordingly, the DAG 400 illustrated in FIG. 5 is generated.

(Weighting Unit)

The weighting unit 112 executes a weighting process for weighting each edge 420 of the DAG 400. Further, the weighting unit 112 outputs information indicating the DAG 400 after the weighting process to the dividing unit 113.

For example, the weighting unit 112 executes the weighting process using the reference DAG. The reference DAG is stored in the storage unit 101 in advance. Further, a reference document file corresponding to the reference DAG is stored in the storage unit 101 in advance in association with the reference DAG. Hereinafter, a pair of the reference DAG and the reference document file corresponding to the reference DAG are also referred to as reference information.

Figure 6:
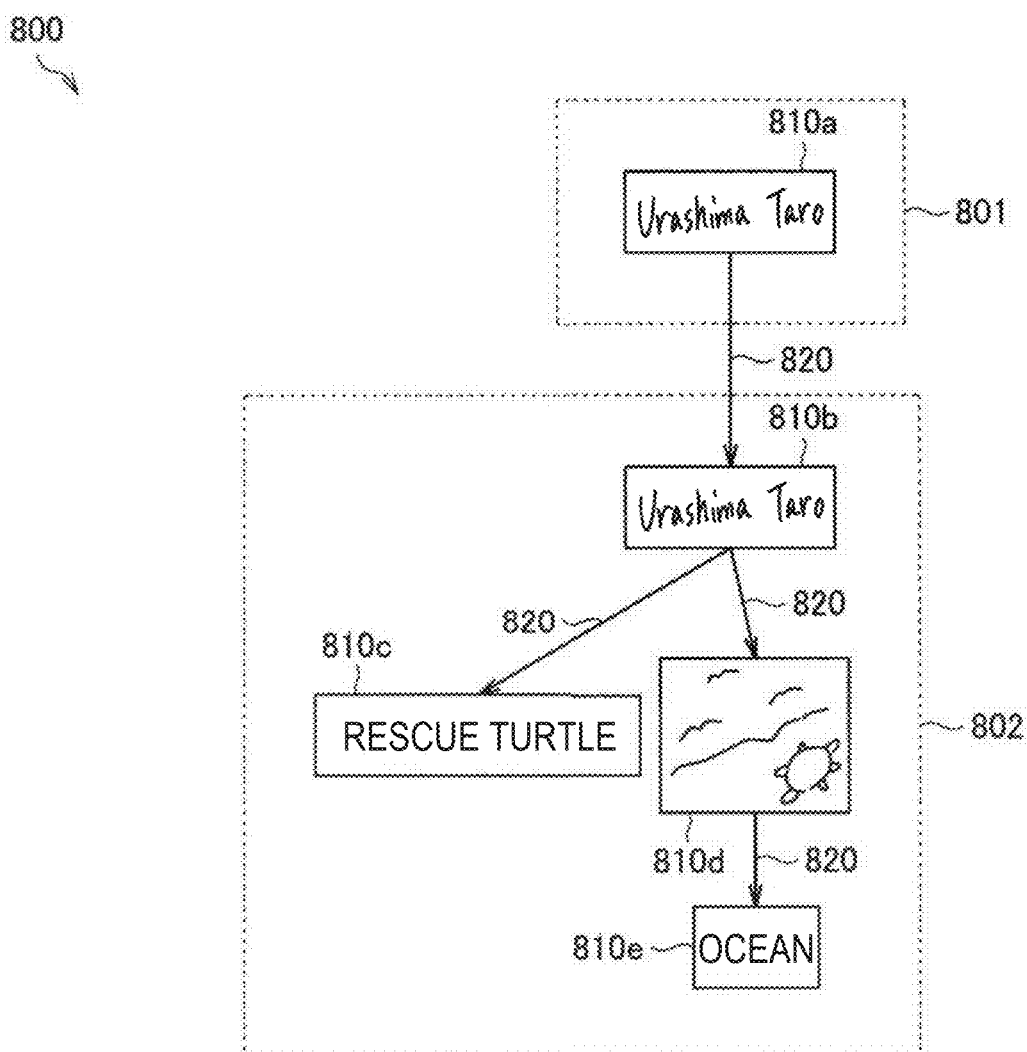
FIG. 6 is an explanatory diagram illustrating an example of a reference directed acyclic graph (reference DAG) stored in a storage unit in advance.

Here, a reference DAG 800 and a reference document file 900 corresponding to the reference information will be described with reference to FIGS. 6 and 7. FIG. 6 is an explanatory diagram illustrating an example of the reference DAG 800 stored in the storage unit 101 in advance. FIG. 7 is an explanatory diagram illustrating an example of the reference document file 900 stored in the storage unit 101 in advance.

In FIG. 6, the reference DAG 800 including a plurality of nodes 810 and a plurality of edges 820 is illustrated. Further, in FIG. 6, letters are appended to the ends of reference numerals of the node 810 to distinguish the respective nodes 810. Further, in FIG. 7, the reference document file 900 including a plurality of objects 910 is illustrated. Further, in the drawing, letters are appended to the ends of reference numerals of the objects 910 to distinguish the respective objects 910.

Specifically, objects 910*a* and 910*b* are objects of handwriting stroke. Further, both the objects 910*a* and 910*b* indicate Urashima Taro. In FIG. 7, a person name "Urashima Taro" is written in the object 910*a* by handwriting. Further, the object 910*d* is an object of image. Further, the object 910*d* indicates the ocean. Further, objects 910*c* and 910*e* are objects of text. Further, the objects 910*c* and 910*e* indicate "rescue turtle" and "ocean," respectively. Further, information indicating each object 910 and the display information related to display of each object 910 in the reference document file 900 are included in the reference information.

The nodes 810*a* to 810*e* of the reference DAG 800 illustrated in FIG. 6 correspond to the objects 910*a* to 910*e* of the reference document file 900 illustrated in FIG. 7. In FIG. 6, display content of the objects 910 corresponding to the respective nodes 810 is schematically illustrated. The reference document file 900 may have a plurality of pages, and the reference DAG 800 may have a partial region corresponding to each of the pages. The node 810 corresponding to the object 910 included in a corresponding page is included in the partial region. For example, as illustrated in FIG. 7, the reference document file 900 includes a page 901 and a page 902. The page 901 includes the object 910*a*, and the page 902 includes the objects 910*b* to 910*e*. Further, as illustrated in FIG. 6, the reference DAG 800 has a partial region 801 and a partial region 802. The partial region 801 includes the node 810*a*, and the partial region 802 includes the nodes 810*b* to 810*e*.

The weighting unit 112 executes a weighting process on the basis of a comparison result of the DAG 400 and the reference DAG 800. For example, the weighting unit 112 executes the weighting process on the basis of a comparison result for structures of the DAG 400 and the reference DAG 800. Specifically, the weighting unit 112 detects a corresponding region that is a region of the DAG 400 corresponding to the partial region of the reference DAG 800 and executes the weighting process so that a weight of the edge 420 in the corresponding region is relatively high. For example, the weighting unit 112 detects a region of the DAG 400 having a structure coinciding with a structure included in the partial region of the reference DAG 800 as a corresponding region.

Figure 8:
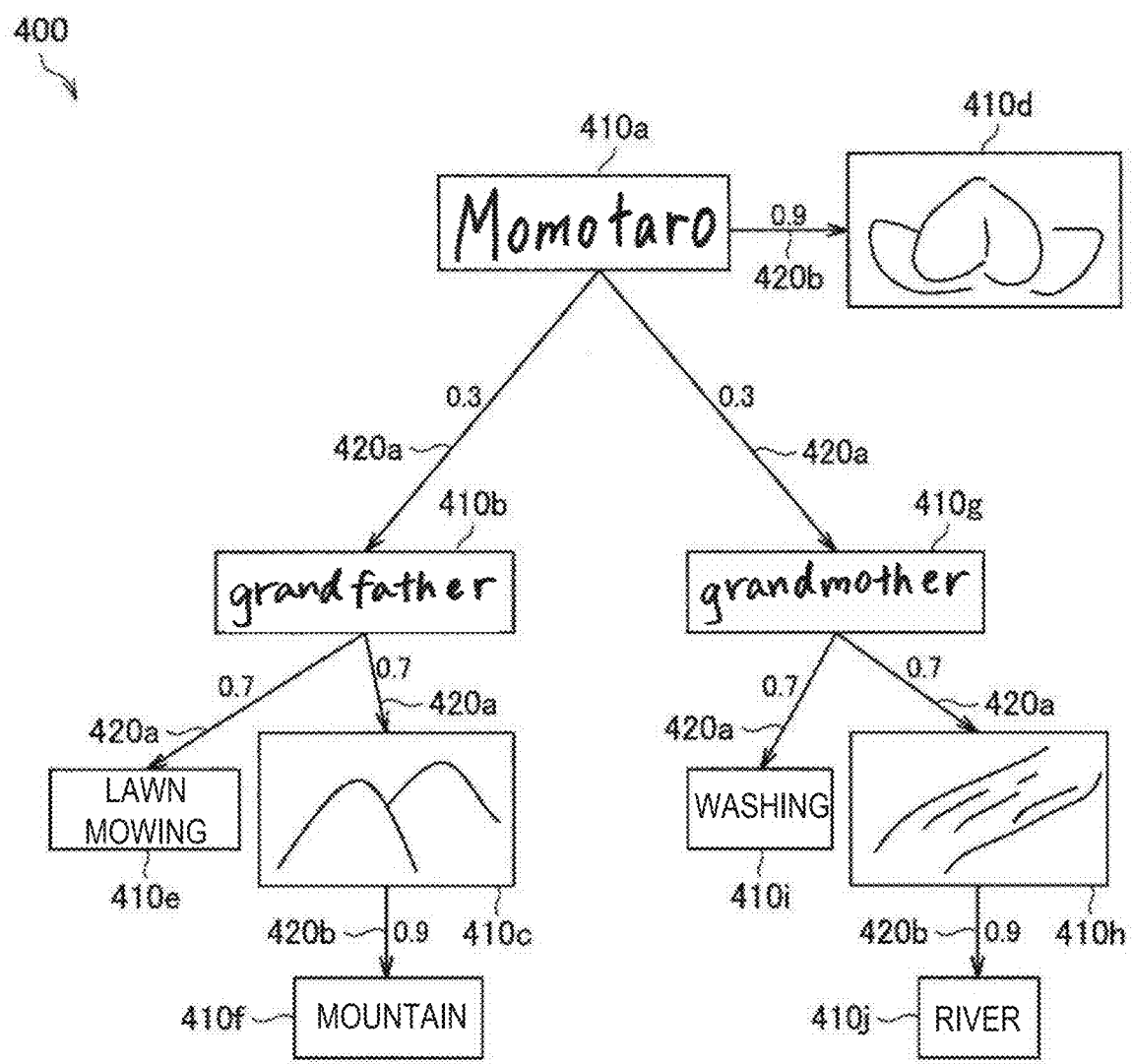
FIG. 8 is an explanatory diagram illustrating an example of a DAG after a weighting process by a weighting unit.

For example, a structure formed by the nodes 810*b*, 810*c*, 810*d*, and 810*e* and the three edges 820 in the partial region 802 of the reference DAG 800 illustrated in FIG. 6 coincides with a structure formed by the nodes 410*b*, 410*e*, 410*c*, and 410*f* and the three edges 420 in the DAG 400 illustrated in FIG. 5. Therefore, the weighting unit 112 detects a region having the structure in the DAG 400 as the corresponding region. In this case, the weighting unit 112 decides, for example, 0.7 corresponding to a relatively high value as the weights of the three edges 420 forming the structure in the DAG 400. Further, the weighting unit 112 may decide the weight on the basis of the relationship information. For example, the weighting unit 112 decides 0.9 as the weight of the edge 420*b* corresponding to the arrow 320*b* to which a world "description" is appended. Further, the weighting unit 112 decides 0.3 as the weight of the edge 420 which has not undergone the structure comparison or the decision of the weight based on the relationship information. Accordingly, the weight is decided for each edge 420 of the DAG 400. FIG. 8 is an explanatory diagram illustrating an example of the DAG 400 after the weighting process by the weighting unit 112.

The weighting process by the weighting unit 112 described above is merely an example, and various processes can be applied as the weighting process. For example, the weighting unit 112 may execute the weighting process on the basis of the comparison result related to the attribute information or the relationship information between the DAG 400 and the reference DAG 800. Specifically, the weighting unit 112 may detect a region having a configuration of the attribute information corresponding to a configuration of the attribute information for the node 810 in the partial region of the reference DAG 800 in the DAG 400 as the corresponding region. Further, the weighting unit 112 may detect a region having a configuration of the relationship information corresponding to a configuration of the relationship information for the edge 820 in the partial region of the reference DAG 800 in the DAG 400 as the corresponding region.

Here, in a case in which a plurality of reference DAGs is used, the weighting unit 112 may detect a plurality of corresponding regions. In this case, for example, the weighting unit 112 may decide a value obtained by averaging weights decided in a case in which the weighting process is executed on each detected corresponding region as a weight. Further, the weighting unit 112 may calculate a degree of similarity between each detected corresponding region and the corresponding partial region of the reference DAG 800 and execute the weighting process on the basis of the degree of similarity. For example, the weighting unit 112 may calculate the degree of similarity on the basis of the comparison result related to the attribute information or the relationship information between the DAG 400 and the reference DAG 800.

Specifically, the weighting unit 112 may calculate the degree of similarity by adding a predetermined value to the degree of similarity in a case in which the attribute information or the relationship information coincides between corresponding nodes or corresponding edges between each corresponding region of the DAG 400 and the partial region of the reference DAG 800 and subtracting a predetermined value from the degree of similarity in a case in which the attribute information or the relationship information does not coincide. Further, in a case in which the attribute information or the relationship information is not set at least either between corresponding nodes or between corresponding edges, the addition or the subtraction on the degree of similarity may not be performed. The weighting unit 112 may perform the weighting process by preferentially using a corresponding region having a high degree of similarity. For example, the weighting unit 112 may decide a value obtained by averaging weights decided in a case in which the weighting process is executed on each selected corresponding region after selecting a predetermined number of corresponding regions in descending order of the degrees of similarity among a plurality of detected corresponding regions as the weight. Further, the weighting unit 112 may decide a value obtained by executing a weighted averaging process based on the degree of similarity on the weight decided in a case in which the weighting process is executed on each detected corresponding region as the weight.

Further, the weighting unit 112 may decide the weight on the basis of the attribute information for the node 410 of the DAG 400. For example, the weighting unit 112 may decide 0.1 as the weight of the edge 420 connected to the node 410 corresponding to the attribute information indicating subject as a role in the generated document file. Further, the weighting unit 112 may decide the weight on the basis of the relationship information for the edge 420 of the DAG 400 as described above. For example, the weighting unit 112 may decide 0.8 as the weight of the edge 420 corresponding to the relationship information indicating a relationship of subject and predicate.

Further, the weighting unit 112 may set a weight value in advance for each of combinations of the attribute information and the relationship information for a target portion including one edge 420 and two nodes 410 connected by the edge 420. Then, the weighting unit 112 may decide a weight value preset corresponding to the combination of the attribute information and the relationship information in the DAG 400 as the weight of each target portion for each of the target portions. Further, the weighting unit 112 may set a weight values in advance for each of combinations of the attribute information and the relationship information using a prediction model which is learned in advance. Using prepared reference information, the prediction model is constructed in accordance with an existing algorithm such as kernel density estimation.

(Dividing Unit)

The dividing unit 113 executes a division process of dividing the DAG 400 after the weighting process into a plurality of partial regions. Further, the dividing unit 113 also outputs the DAG 400 after the division process to the display information generating unit 114 and the storage unit 101.

Figure 9:
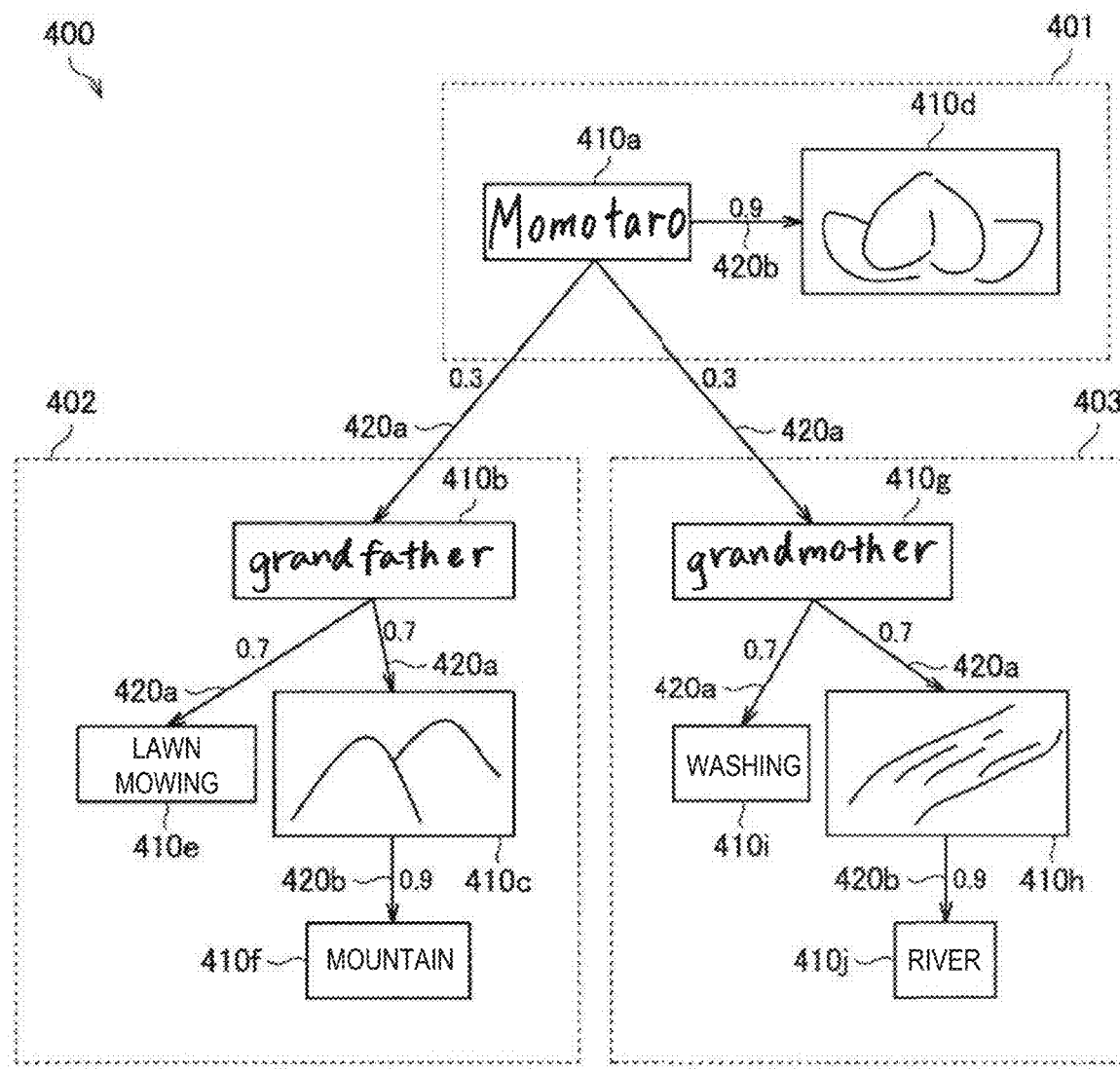
FIG. 9 is an explanatory diagram illustrating an example of a DAG after a division process by a dividing unit.

For example, the dividing unit 113 may divide the DAG 400 into a plurality of partial regions by cutting the edge 420 whose weight is equal to or less than a threshold value in the DAG 400 after the weighting process. For example, in a case in which the threshold value is set to 0.5, the DAG 400 is divided into a plurality of partial regions as illustrated in FIG. 9. FIG. 9 is an explanatory diagram illustrating an example of the DAG 400 after the division process by the dividing unit 113. Specifically, since a weight of the edge 420*a* between the nodes 410*a* and 410*b* and a weight of the edge 420*a* between the nodes 410*a* and 410*g* are 0.3, it is less than the threshold value. Thus, the dividing unit 113 cuts the edges 420*a*. Accordingly, as illustrated in FIG. 9, the DAG 400 is divided into a partial region 401 including the nodes 410*a* and 410*d*, a partial region 402 including the nodes 410*b*, 410*e*, 410*c*, and 410*f*, and a partial region 403 including the nodes 410*g*, 410*i*, 410*h*, and 410*j*.

Further, the dividing unit 113 may execute the division process on the basis of an information amount of the input object 310 corresponding to each node 410. For example, the dividing unit 113 may divide the DAG 400 into a plurality of the partial region by cutting the edge 420 so that a sum value of the information amounts of the input objects 310 corresponding to the nodes 410 included in each partial region is equal to or less than a predetermined value. As will be described later, each partial region corresponds to a page of the document file to be generated. Hence, the sum value of the information amounts of the input objects 310 corresponding to the nodes 410 included in each partial region corresponds to an information amount of each page of the generated document file. Therefore, the predetermined value can be appropriately set from a viewpoint of preventing an excessive increase in an information amount per page of the generated document file. Further, the predetermined value can be set using a prediction model which is learned in advance. Using prepared reference information, the prediction model is constructed in accordance with an existing algorithm such as various kinds of statistical techniques.

Further, the dividing unit 113 may divide the DAG 400 into a plurality of partial regions by cutting the edge 420 so that the number of edges 420 to be cut is a predetermined value. As the number of edges 420 to be cut increase, a computational cost in the processing performed by the information processing device 10 may increase. Therefore, the predetermined value can be appropriately set from the viewpoint of suppressing an increase in the computational cost in the process performed by the information processing device 10. Further, the predetermined value can be set using a prediction model which is learned in advance. Using prepared reference information, the prediction model is constructed in accordance with an existing algorithm such as various kinds of statistical techniques.

(Display Information Generating Unit)

The display information generating unit 114 generates the display information related to the display of the output object in the document file to be generated. Further, the display information generating unit 114 outputs the generated display information to the file generating unit 115.

In other words, the display information is information having influence on the appearance of the output object in the document file. The display information includes the position information indicating the position of the output object in the document file. Further, in addition to the position information, specifically, the display information includes dimension information indicating the dimension of the output object, color information indicating the color of the output object, or page information indicating a page in which the output object is positioned in the document file. Specifically, information indicating a font, a font size, a character thickness, or a line space can be applied as display information for an output object of text. Further, information indicating a color tone or a style can be applied as the display information for an output object of image. Further, information related to expression of shadow, reflection, or transparency can be applied as display information for various kinds of output objects.

The display information generating unit 114 generates the display information, for example, on the basis of the DAG 400 after the division process. For the input object 310 corresponding to each node 410 of the DAG 400, the display information generating unit 114 generates the display information of the output object corresponding to the input object 310. A correspondence relation between the input object 310 and the output object can be appropriately set. For example, it is considered that the input object 310 of handwriting stroke corresponds to the output object of text having common content. Further, it is considered that an output object of image to which a frame surrounding the input object 310 is added corresponds to the input object 310 of image. Further, the input object 310 and the output object may be substantially identical to each other. An example in which the input object 310 and the output object are sub-stantially identical to each other will be described below in order to facilitate understanding.

Specifically, the display information generating unit 114 generates the display information on the basis of the comparison result between the DAG 400 after the division process and the reference DAG 800. For example, the display information generating unit 114 generates the display information on the basis of the comparison result for the structure of the DAG 400 and the reference DAG 800. Specifically, the display information generating unit 114 detects the corresponding region which is a region of the DAG 400 corresponding to the partial region of the reference DAG 800, and generates the display information of the output object for each node 410 in the corresponding region on the basis of the reference information. For example, the display information generating unit 114 detects a region of the DAG 400 having a structure coinciding with a structure included in the partial region of the reference DAG 800 as a corresponding region.

For example, the structure formed by the nodes 810b, 810c, 810d, and 810e and the three edges 820 in the partial region 802 of the reference DAG 800 illustrated in FIG. 6 coincides with the structures formed by the nodes 410b, 410e, 410c, and 410f and the three edges 420 in the partial region 402 of the DAG 400 after the division process illustrated in FIG. 9. Therefore, the display information generating unit 114 detects the partial region 402 of the DAG 400 as the corresponding region. Here, as the display information of the output object for the node 410 included in the corresponding region of the DAG 400, for example, the display information generating unit 114 generates information identical to the display information of the object 910 of the reference document file 900 for the node 810 of the reference DAG 800 corresponding to the node 410.

The nodes 410b, 410e, 410c, and 410f included in the partial region 402 of the DAG 400 correspond to the nodes 810b, 810c, 810d, and 810e included in the partial region 802 of the reference DAG 800, respectively. Further, the nodes 810b, 810c, 810d, and 810e included in the partial region 802 of the reference DAG 800 correspond to the objects 910b to 910e included in the page 902 of the reference document file 900, respectively. Therefore, as the display information related to the nodes 410b, 410e, 410c, and 410f included in the partial region 402 of the DAG 400, the display information generating unit 114 generates information identical to the display information of each of the objects 910b to 910e included in the page 902 of the reference document file 900. For example, the display information generating unit 114 generates information identical to the position information of each of the objects 910b to 910e as the display information for the nodes 410b, 410e, 410c, and 410f.

Further, the structure formed by the nodes 810b, 810c, 810d, and 810e and the three edges 820 in the partial region 802 of the reference DAG 800 illustrated in FIG. 6 coincides with the structure formed by the nodes 410g, 410i, 410h, and 410j and the three edges 420 om the partial region 403 of the DAG 400 after the division process illustrated in FIG. 9. Therefore, the display information generating unit 114 detects the partial region 403 of the DAG 400 as the corresponding region. The nodes 410g, 410i, 410h, and 410j included in the partial region 403 of the DAG 400 correspond to the nodes 810b, 810c, 810d, and 810e included in the partial region 802 of the reference DAG 800, respectively. Therefore, as the display information for the nodes 410g, 410i, 410h, and 410j included in the partial region 403 of the DAG 400, the display information generating unit 114 generate information identical to the display information of each of the objects 910*b* to 910*e* included in the page 902 of the reference document file 900. For example, the display information generating unit 114 generates information identical to the position information of each of the objects 910*b* to 910*e* as the display information for the nodes 410*g*, 410*i*, 410*h*, and 410*j*.

Further, the display information generating unit 114 may decide the display information related to the basis of the relationship information. Specifically, in a case in which an explanatory relationship is input as the relationship information for the edge 420 connecting the two nodes 410, the display information generating unit 114 may generate the position information of both output objects an output object corresponding to the input object 310 an explained side is positioned below an output object corresponding to the input object 310 on an explaining side. For example, in the partial region 403 of the DAG 400 after the division process illustrated in FIG. 9, the nodes 410*a* and 410*d* are connected by the edge 420*b* corresponding to the arrow 320*b* with a world of explanation. Further, as described above, 410*d* corresponds to the input object 310*d* on the explained side. On the other hand, 410*a* corresponds to the input object 310*a* on the explaining side. Therefore, the display information generating unit 114 generates information indicating a position lower than a position indicated by the position information of the output object for the node 410*a* as the position information of the output object for the node 410*d*.

Further, the display information generating unit 114 generates different page information for the nodes 410 included in different partial regions. Further, the display information generating unit 114 generates the same page information for the node 410 included in the same partial region. For example, for the nodes 410*a* and 410*d* included in the partial region 401 of the DAG 400, information indicating a page 501 is generated as the page information. Further, for the nodes 410*b*, 410*e*, 410*c*, and 410*f* included in the partial region 402 of the DAG 400, information indicating a page 502 is generated as the page information. Further, for the nodes 410*g*, 410*i*, 410*h*, and 410*j* included in the partial region 403 of the DAG 400, information indicating a page 503 is generated as the page information.

As will be described later, the document file is generated by the file generating unit 115 on the basis of the display information. FIG. 10 is an explanatory diagram illustrating an example of a document file 500 generated by the file generating unit 115. In FIG. 10, the document file 500 including a plurality of output objects 510 is illustrated. Further, in FIG. 10, letters are appended to the ends of reference numerals of the output objects 510 to distinguish the respective output objects 510.

Specifically, output objects 510*a* to 510*j* correspond to the input objects 310*a* to 310*j* illustrated in FIGS. 2 and 3, respectively. In FIG. 10, display content of the input objects 310 corresponding to the output objects 510 is schematically illustrated. Specifically, the output objects 510*a* to 510*j* coincide with the input objects 310*a* to 310*j* illustrated in FIGS. 2 and 3, respectively. Further, as illustrated in FIG. 10, document file 500 includes the page 501, the page 502, and the page 503. The page 501 includes the output objects 510*a* and 510*d*, the page 502 includes the output objects 510*b*, 510*e*, 510*c*, and 510*f*, and the page 503 includes the output objects 510*g*, 510*i*, 510*h*, and 510*j*. Further, in FIG. 10, an example in which the output object 510*d* is positioned below the output object 510*a* in the page 501 is illustrated. Further, in FIG. 10, an example in which the positions of the respective output objects 510 of the page 502 and the page 503 coincide with the positions of the respective objects 910 of the page 902 of the reference document file 900 illustrated in FIG. 7 is illustrated.

The display information generation process by the display information generating unit 114 described above is merely an example, and various processes can be applied as the display information generation process. For example, the display information generating unit 114 may generate the display information on the basis of the comparison result related to the attribute information or the relationship information between the DAG 400 and the reference DAG 800. Specifically, in the DAG 400, the display information generating unit 114 may detect a region having a configuration of the attribute information corresponding to a configuration of the attribute information for the node 810 in the partial region of the reference DAG 800 in the DAG 400 as the corresponding region. Further, the display information generating unit 114 may detect a region having a configuration of the relationship information corresponding to a configuration of the relationship information for the edge 820 in the partial region of the reference DAG 800 in the DAG 400 as the corresponding region.

Here, in a case in which a plurality of reference DAGs is used, the display information generating unit 114 may detect a plurality of corresponding regions. In this case, for example, the display information generating unit 114 may decide information obtained by averaging the generated information in a case in which the display information is generated for each detected corresponding region as display information. Further, the display information generating unit 114 may calculate a degree of similarity between each detected corresponding region and the corresponding partial region of the reference DAG 800 and generate the display information on the basis of the degree of similarity. For example, the display information generating unit 114 may calculate the degree of similarity on the basis of the comparison result related to the attribute information or the relationship information between the DAG 400 and the reference DAG 800.

Specifically, the display information generating unit 114 may calculate the degree of similarity by adding a predetermined value to the degree of similarity in a case in which the attribute information or the relationship information coincides between corresponding nodes or corresponding edges between each corresponding region of the DAG 400 and the partial region of the reference DAG 800 and subtracting a predetermined value from the degree of similarity in a case in which the attribute information or the relationship information does not coincide. Further, in a case in which the attribute information or the relationship information is not set at least either between corresponding nodes or between corresponding edges, the addition or the subtraction on the degree of similarity may not be performed. The display information generating unit 114 may generate the display information by preferentially using a corresponding region having a high degree of similarity. For example, the display information generating unit 114 may decide information obtained by averaging information generated in a case in which the display information is generated for each selected corresponding region after selecting a predetermined number of corresponding regions in descending order of the degrees of similarity among a plurality of detected corresponding regions as the display information. Further, the display information generating unit 114 may decide information obtained by executing a weighted averaging process based on the degree of similarity on the information generated in a case in which the display information is generated for each detected corresponding region as the display information.

Further, the display information generating unit 114 may generate the display information on the basis of the attribute information for the node 410 of the DAG 400. Accordingly, the display information can be more appropriately generated in accordance with the attribute information. For example, in a case in which the attribute information indicating subject as a role in the document file 500 is input as the attribute information corresponding to a certain node 410, the display information generating unit 114 may generate information indicating that an Y coordinate is 40 pixels as the position information of the output object 510 for the node 410.

Further, in a case in which the number of nodes 410 in a certain partial region of the DAG 400 is 1, the display information generating unit 114 may generate information indicating the center of a corresponding page of the document file 500 as the position information of the output object 510 for the node 410.

Further, the display information generating unit 114 may generate the display information on the basis of the weight of the edge 420 of the DAG 400. Specifically, the display information generating unit 114 may generate the position information of the two output objects 510 so that the distance between the two output objects 510 for the two nodes 410 decreases as the weight of the edge 420 connecting the two nodes 410 increases.

Further, the display information generating unit 114 may set the display information in advance for each combination of the attribute information and the relationship information for a target portion including one edge 420 and two nodes 410 connected by the edge 420. Then, the display information generating unit 114 may decide the display information preset corresponding to the combination of the attribute information and the relationship information for each target portion in the DAG 400 as the display information of each target portion. Further, the display information generating unit 114 may set the display information in advance for each combination of the attribute information and the relationship information by using a prediction model which is learned in advance. Using prepared reference information, the prediction model is constructed in accordance with an existing algorithm such as kernel density estimation.

(File Generating Unit)

The file generating unit 115 generates the document file 500 on the basis of the display information. Further, the file generating unit 115 outputs the generated document file 500 to the display information generating unit 114, the display control unit 107, and the storage unit 101.

Specifically, the file generating unit 115 generates the document file 500 so that each output object 510 corresponding to each input object 310 which is input is displayed on the basis of the display information of each output object 510. Further, the file generating unit 115 may incorporate information indicating each output object 510 and the display information of each output object 510 into the document file 500.

Further, the file generating unit 115 may generate a plurality of document files 500. Accordingly, the document file 500 can be selected from candidates by the user. For example, the file generating unit 115 may calculate the likelihood of each document file 500 on the basis of the degree of similarity calculated in the detection of the corresponding region using the DAG 400 and the reference DAG 800 in the weighting process or the display information generation process described above. The file generating unit 115 may output information indicating the likelihood of each document file 500 to the display control unit 107. For example, the display control unit 107 may cause the display device to display the respective document files 500 while giving priority to a file with high likelihood. Further, the display control unit 107 may cause the display device to simultaneously display a plurality of document files 500. In this case, the display control unit 107 may cause the display device to display the likelihood of each document file 500 together with a plurality of document files 500.

The file generating unit 115 may add the output object to the document file on the basis of the relationship information. Accordingly, it is possible to effectively reduce time and effort of the user for editing which can be performed after the document file 500 is generated. An example in which information input by the user is different from that in the example described above with reference to FIGS. 2 to 10 will now be described with reference to FIGS. 11 and 12.

Figure 11:
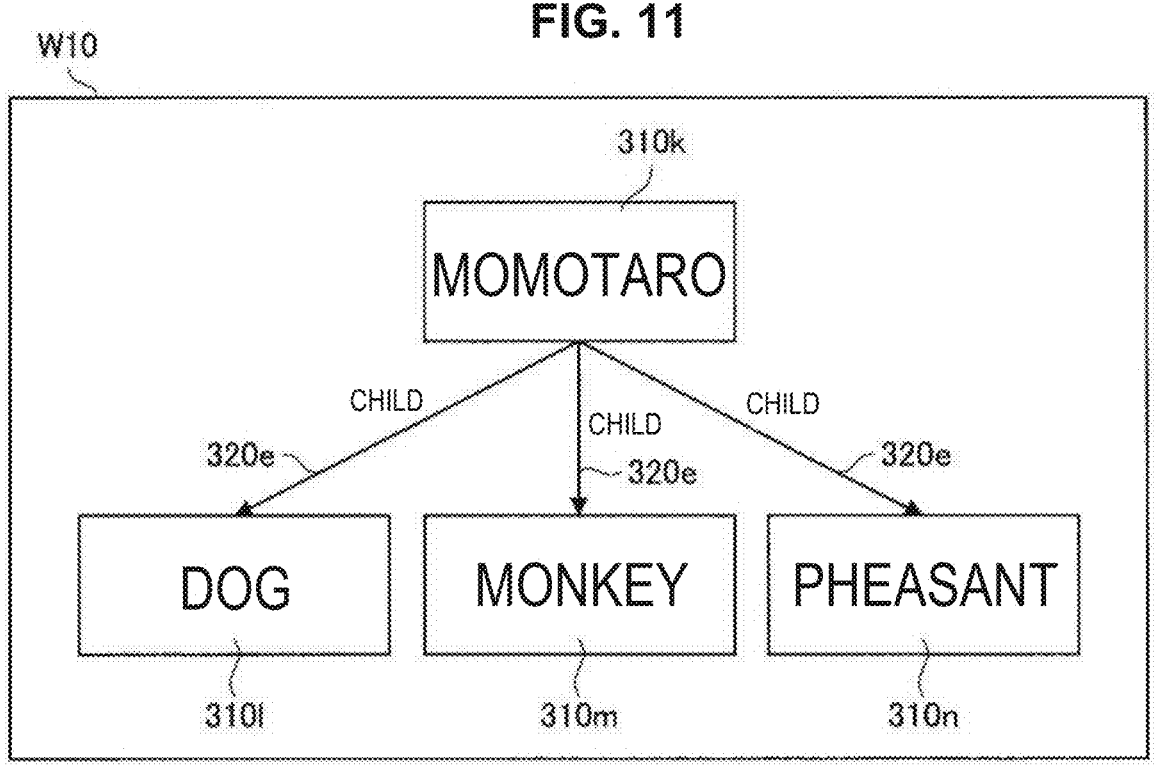
FIG. 11 is an explanatory diagram illustrating an example of an input window displayed by an information processing device according to the embodiment.

FIG. 11 illustrates an example of the input window W10 after the input object 310 and the arrow 320 are input. In the input window W10, a plurality of input objects 310 and a plurality of arrows 320 are illustrated. Specifically, input objects 310k, 310l, 310m, and 310n are objects of text. Further, the input objects 310k, 310l, 310m, and 310n indicate Momotaro, dog, monkey, and pheasant, respectively. Further, the arrow 320e is an arrow with a world "child" and indicates that there is a parent-child relationship between the corresponding two input objects 310. Further, the arrow 320e indicates a relationship that the input object 310 on the side indicated by the arrow 320e is a child of the input object 310 on the other side.

The acquiring unit 103 acquires the relationship information for each of the three arrows 320e and outputs the relationship information to the file control unit 110. In the case illustrated in FIG. 11, the relationship that each of a plurality of input objects 310l, 310m, and 310n is a child of the input object 310k corresponding to a common parent is indicated by the three arrows 320e. As described above, for example, in a case in which each of a plurality of input objects 310 corresponds to a child of the input object 310 corresponding to a common parent, the file generating unit 115 may add an output object 510p indicating a parent-child relationship to the document file 500.

Figure 12:
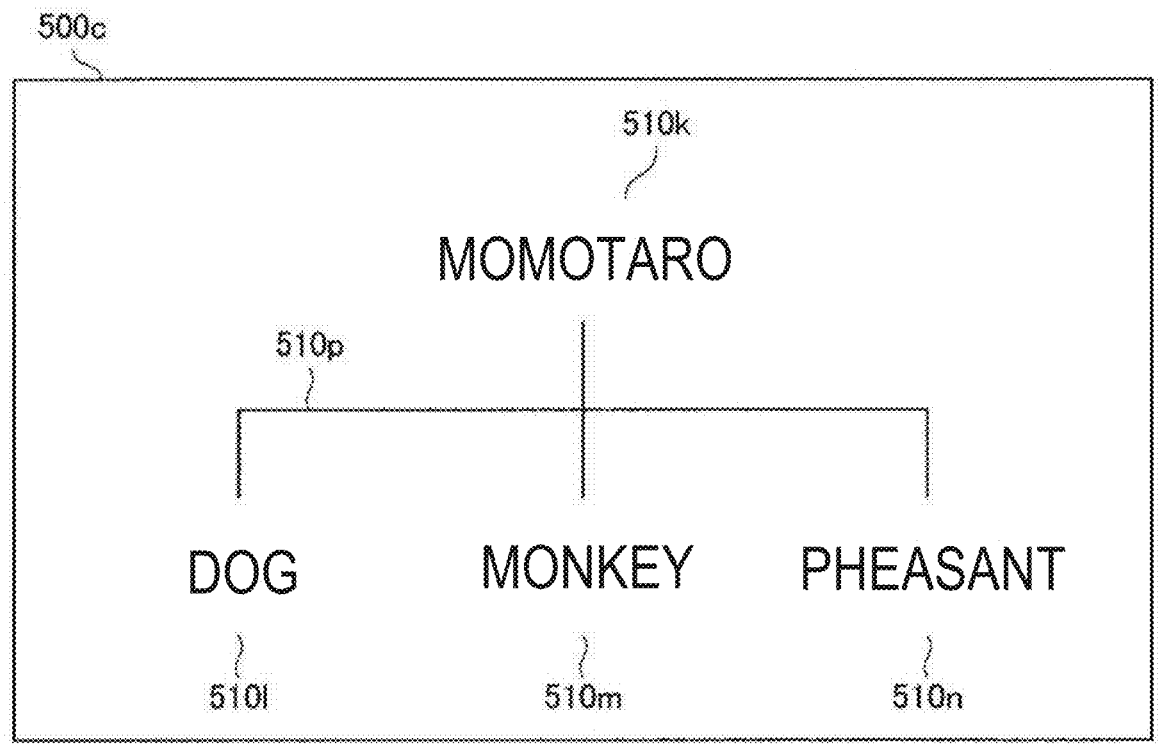
FIG. 12 is an explanatory diagram illustrating an example of a document file generated by a file generating unit according to the embodiment.

FIG. 12 is an explanatory diagram illustrating an example of a document file 500c generated by the file generating unit 115 in this case. In FIG. 12, the document file 500c including a plurality of output objects 510 is illustrated. Specifically, the output objects 510k to 510n correspond to the input objects 310k to 310n illustrated in FIG. 11, respectively. Further, the output object 510p is an added output object indicating the parent-child relationship. The output object 510p connects the output object 510k corresponding to the parent with a plurality of output objects 510l, 510m, and 510n corresponding to the children.

(1-1-4. Display Control Unit)

The display control unit 107 controls display of various screens. Specifically, the display control unit 107 controls display of screen by a display device which is installed integrally with or separately from the information processing device 10. Specifically, the display control unit 107 controls the display of the screen by the display device by outputting a control command for causing various kinds of screen to be displayed to the display device. For example, the display control unit 107 may control the display of the screen by the display device in accordance with an input manipulation of the user. An example in which the document file 500 illustrated in FIG. 10 is generated by executing a series of processes by the information processing device 10 described with reference to FIGS. 2 to 10 will be described below.

Specifically, the display control unit 107 controls display of the generated document file 500. For example, the display control unit 107 controls the display of the screen display including an input side display region in which information input for generating or editing the document file 500 is displayed and an output side display region in which the generated or edited document file 500 is displayed. The display control unit 107 causes a generation screen or an editing screen to be displayed on the display device as such a screen. The generation screen and the editing screen will be described with reference to specific examples illustrated in FIGS. 13 to 17.

Figure 13:
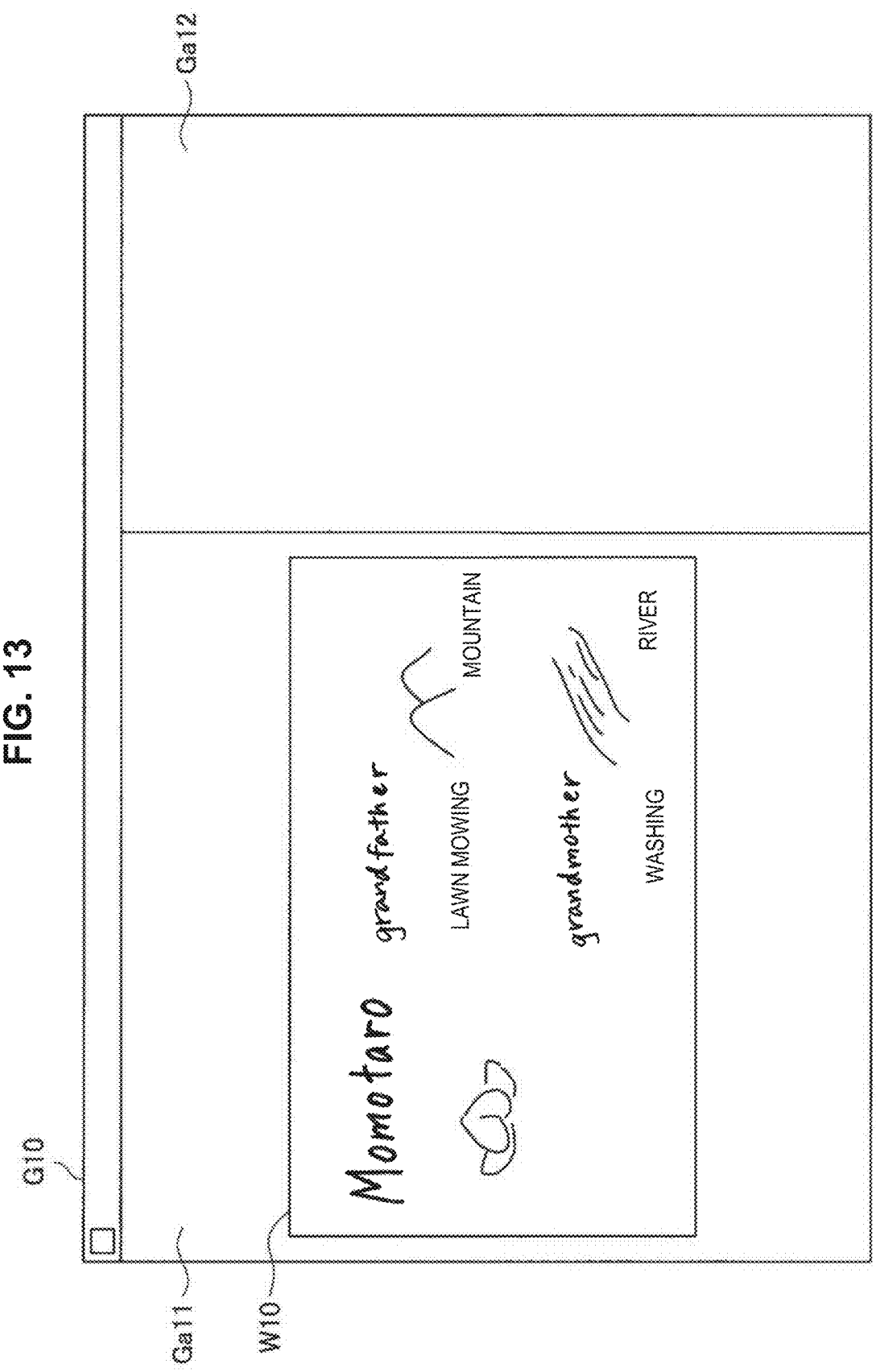
FIG. 13 is an explanatory diagram illustrating an example of a generation screen displayed by an information processing device according to the embodiment.
Figure 14:
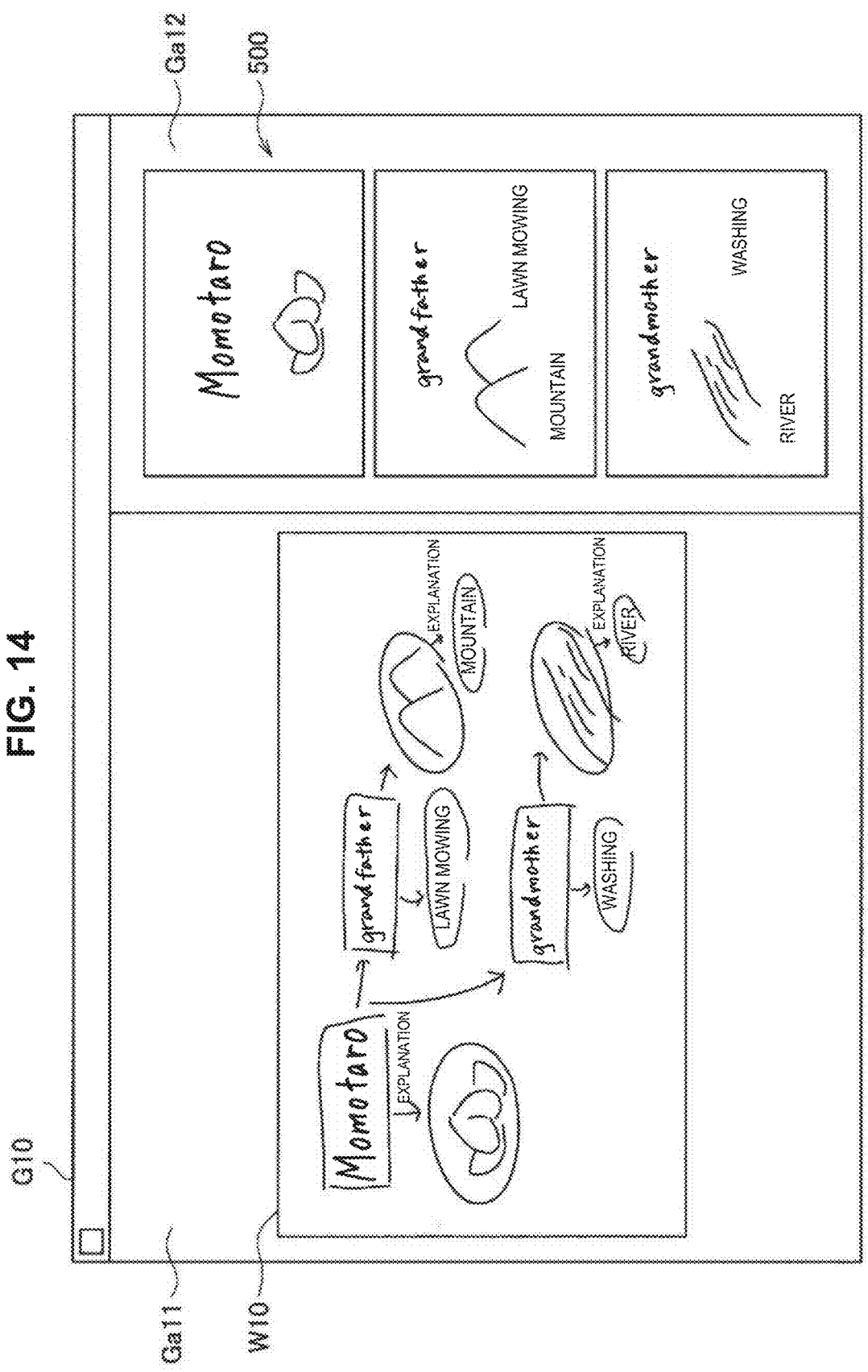
FIG. 14 is an explanatory diagram illustrating an example of a generation screen displayed by an information processing device according to the embodiment.

First, the generation screen will be described with reference to FIG. 13 and FIG. 14. FIGS. 13 and 14 are explanatory diagrams illustrating an example of a generation screen G10 displayed by the information processing device 10 according to the present embodiment. The generation screen G10 is a screen used when the user generates the document file 500.

As illustrated in FIG. 13, the generation screen G10 includes an input side display region Ga11 and an output side display region Ga12. For example, the input side display region Ga11 is positioned on the left side of the generation screen G10, and the output side display region Ga12 is positioned on the right side of the generation screen G10. In the generation screen G10, information input for generating the document file 500 is displayed in the input side display region Ga11. Specifically, a plurality of input objects 310 and the input arrow 320 are displayed in the input side display region Ga11. More specifically, the input window W10 is displayed in the input side display region Ga11, and a plurality of input objects 310 and the input arrows 320 are displayed in the input window W10. Further, in the generation screen G10, the document file 500 generated by the file control unit 110 is displayed in the output side display region Ga12.

FIG. 13 specifically illustrates the generation screen G10 after the input object 310 is input. Since the arrow 320 has not been input after the input object 310 was input, the arrow 320 is not displayed in the input window W10. Therefore, for example, the input window W10 illustrated in FIG. 2 is displayed in the input side display region Ga11. Further, since the document file 500 is not generated after the input object 310 is input, the document file 500 is not displayed in the output side display region Ga12 as illustrated in FIG. 13.

FIG. 14 specifically illustrates the generation screen G10 after the arrow 320 serving as the input symbol is input. After the arrow 320 is input, the input arrow 320 is displayed in the input window W10. Therefore, for example, the input window W10 illustrated in FIG. 3 is displayed in the input side display region Ga11. Further, since the document file 500 can be generated after the arrow 320 is input, the document file 500 is displayed in the output side display region Ga12 as illustrated in FIG. 14.

As described above, the display control unit 107 causes a plurality of input objects 310 and the input arrows 320 to be displayed in the input side display region Ga11, and causes the generated document file 500 to be displayed in the output side display region Ga12. For example, the file control unit 110 may generate the document file 500 at each timing at which each arrow 320 is input. In this case, the display control unit 107 may cause the document file 500 updated with the input of each arrow 320 to be sequentially displayed in the output side display region Ga12. Accordingly, it is possible to present the generation process of the document file 500 to the user in real time.

Further, the generation of the document file 500 by the file control unit 110 and the control of the display of the document file 500 by the display control unit 107 may be executed in accordance with an input manipulation of the user.

Further, the display control unit 107 may cause various kinds of information such as the relationship information and the attribute information to be displayed in the generation screen G10. For example, the display control unit 107 may cause the relationship information corresponding to the arrow 320 to be displayed in the vicinity of each arrow 320 in the input window W10. Further, the display control unit 107 may cause the attribute information corresponding to each input object 310 to be displayed in the vicinity of each input object 310 in the input window W10.

Figure 15:
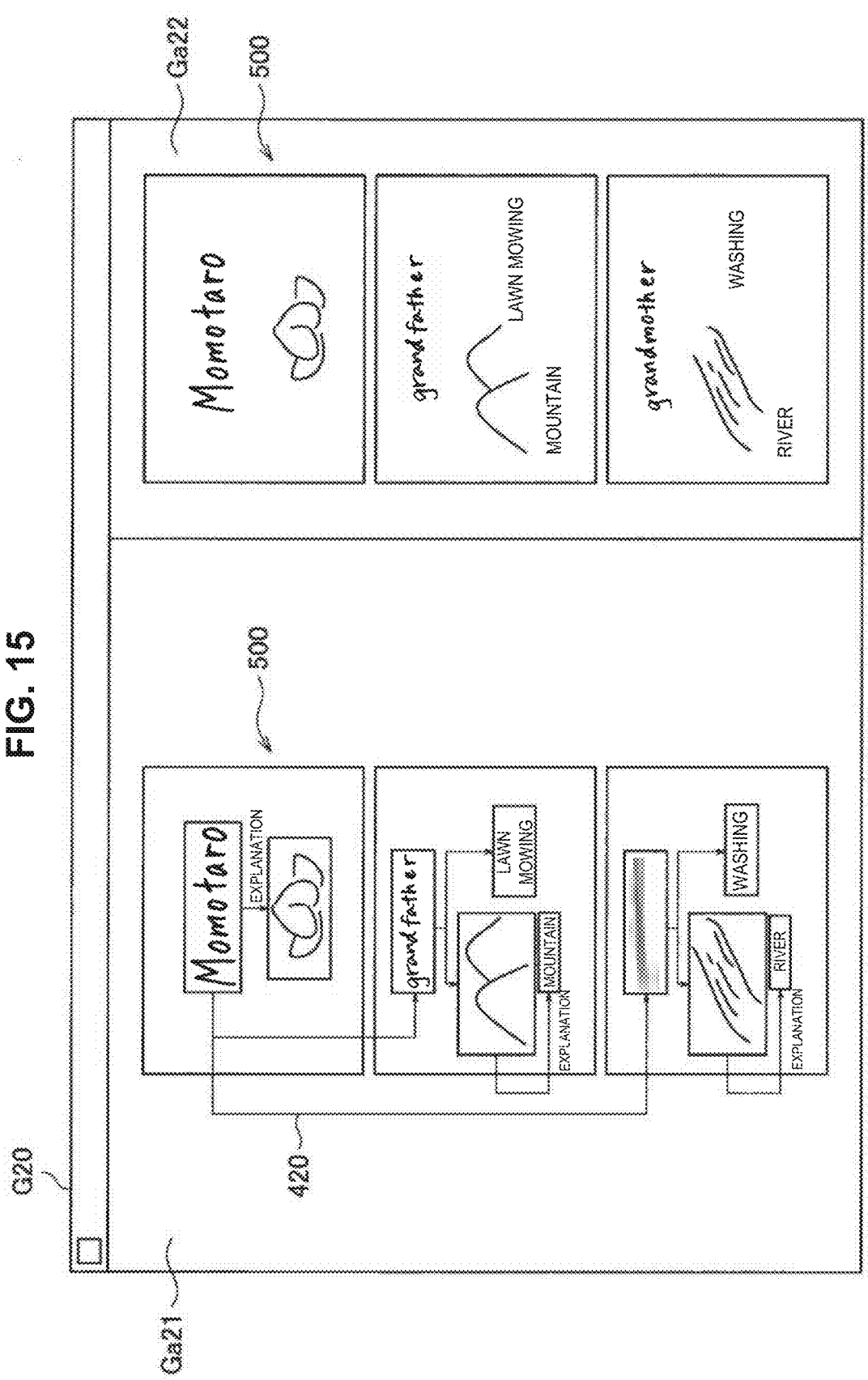
FIG. 15 is an explanatory diagram illustrating an example of an editing screen displayed by an information processing device according to the embodiment.
Figure 16:
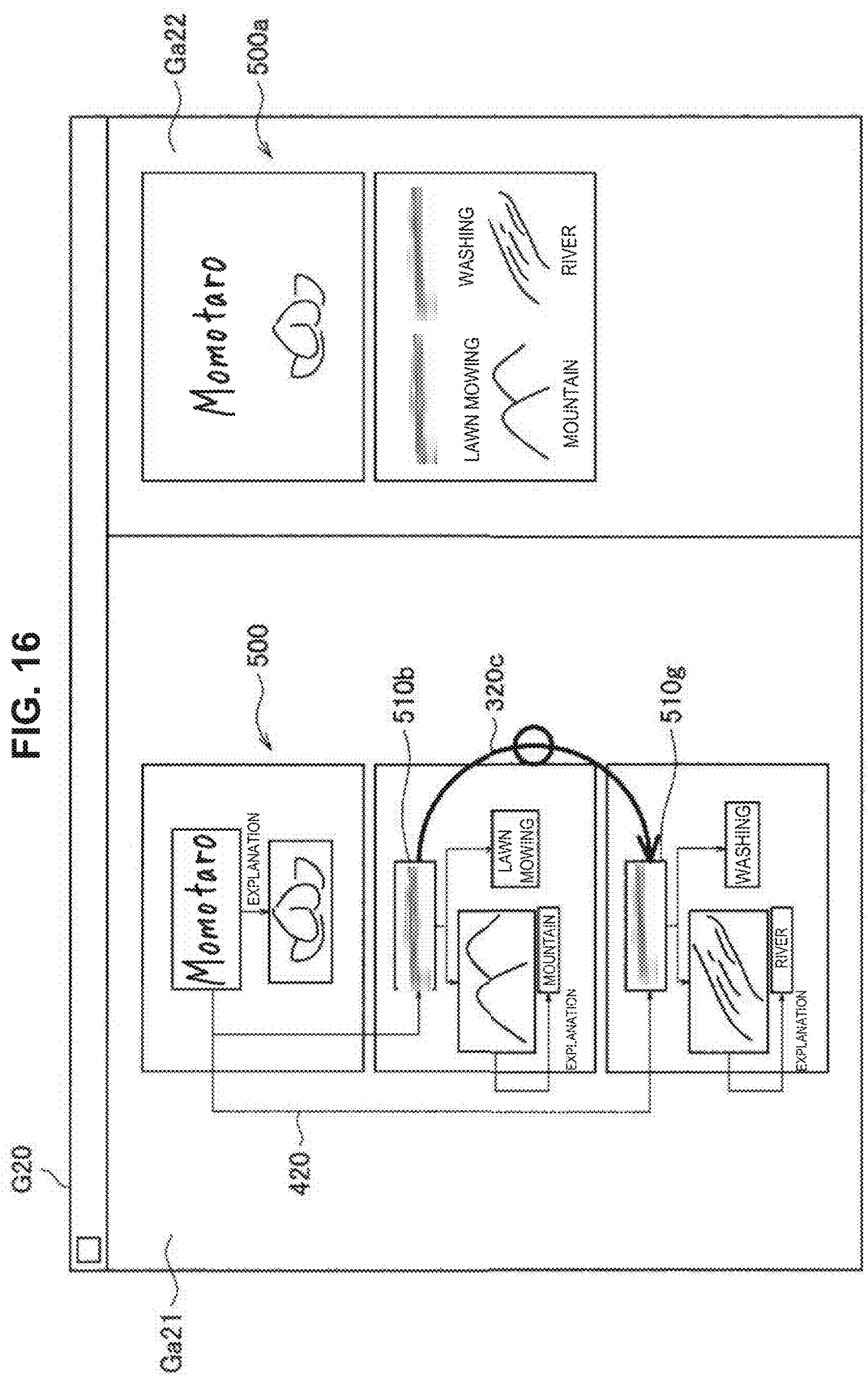
FIG. 16 is an explanatory diagram illustrating an example of an editing screen displayed by an information processing device according to the embodiment.
Figure 17:
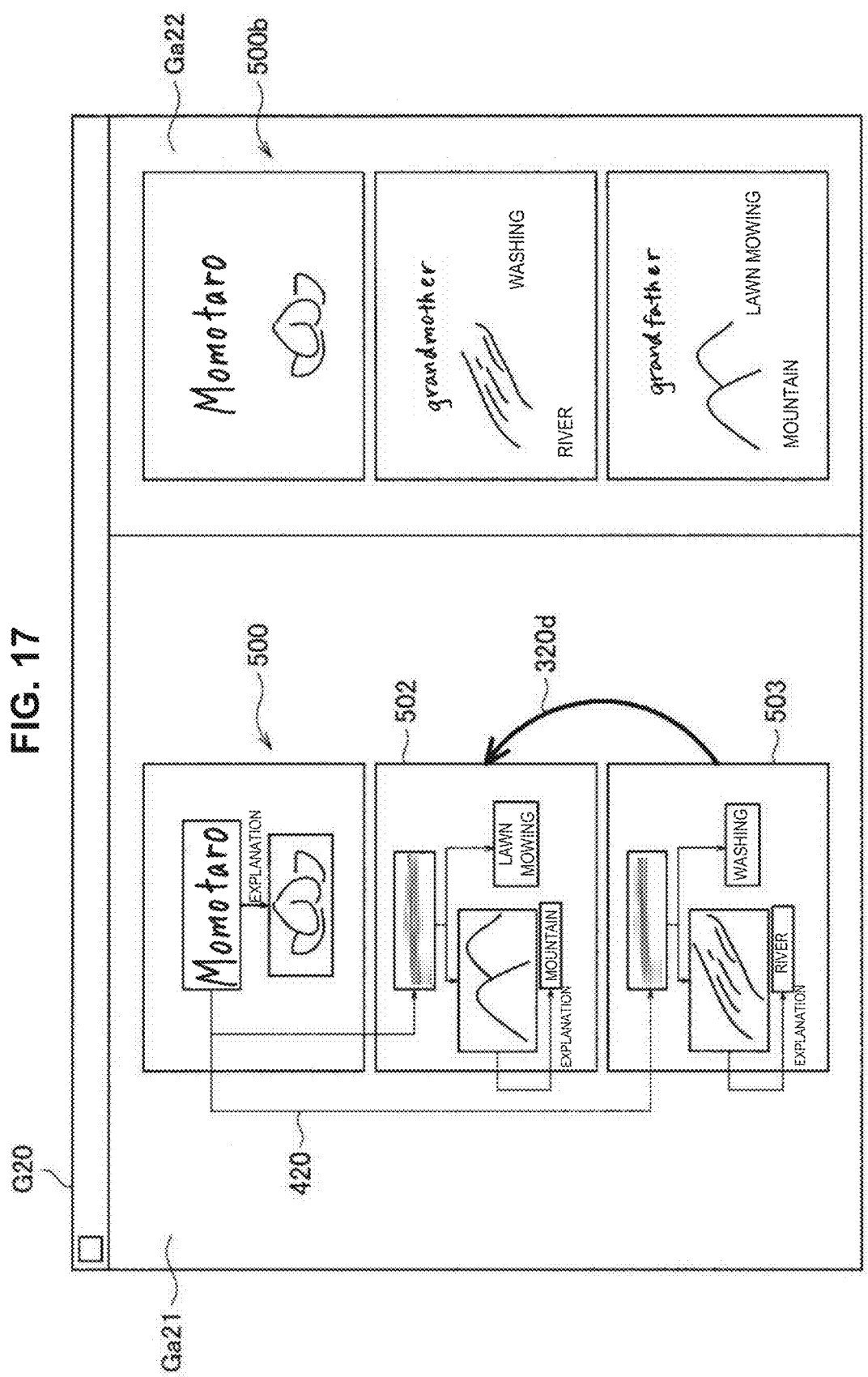
FIG. 17 is an explanatory diagram illustrating an example of an editing screen displayed by an information processing device according to the embodiment.

Next, the editing screen will be described with reference to FIG. 15 to FIG. 17. FIGS. 15 to 17 are explanatory diagrams illustrating an example of an editing screen G20 displayed by the information processing device 10 according to the present embodiment. The editing screen G20 is a screen used by the user when the user edits the generated document file 500. Further, the display control unit 107 may switch between the generation screen G10 and the editing screen G20 in accordance with an input manipulation of the user.

As illustrated in FIG. 15, the editing screen G20 includes an input side display region Ga21 and an output side display region Ga22, similarly to the generation screen G10. In the editing screen G20, information input for editing the document file 500 is displayed in the input side display region Ga21. Specifically, an image in which the edge 420 of the DAG 400 is superimposed on the generated document file 500 and an input editing symbol are displayed in the input side display region Ga21. Further, the editing symbol corresponds to a second symbol in a case in which the input symbol indicating the relationship between a plurality of input objects 310 is a first symbol. The editing symbol is an editing symbol for editing the document file 500, and indicates, for example, a relationship between a plurality of output objects 510 or a relationship between a plurality of pages. As the editing symbols, various symbols can be applied, similarly to input symbols. Further, by applying symbols similar to the respective input symbols illustrated in FIG. 4 as the editing symbol, it is possible to indicate various relationship indicated by the respective input symbols. Further, in the editing screen G20, the document file 500 edited by the file control unit 110 is displayed in the output side display region Ga22.

FIG. 15 specifically illustrates the editing screen G20 after the document file 500 is generated. Since an editing arrow is not input after the document file 500 is generated, as illustrated in FIG. 15, the image in which the edge 420 of the DAG 400 is superimposed on the generated document file 500 is displayed in the input side display region Ga21. Further, since the document file 500 is not edited after the document file 500 is generated, the generated document file 500 is displayed in the output side display region Ga22 as illustrated in FIG. 15.

FIG. 16 specifically illustrates a first example of the editing screen G20 after the document file 500 is edited. The first example is an example in which an editing arrow 320*c* serving as an editing symbol connecting two output objects 510 is input. Specifically, the editing arrow 320*c* connects the output object 510*b* and the output object 510*g*, and indicates a relationship between the two output objects 510.

In a case in which the editing arrow 320c is input, the editing arrow 320c is displayed in the input side display region Ga21 as illustrated in FIG. 16. Further, in a case in which the editing arrow 320c is input, information indicating the relationship indicated by the editing arrow 320c is acquired by the acquiring unit 103. Then, the file control unit 110 edits the document file 500 on the basis of the information. The editing arrow 320c illustrated in FIG. 16 indicates, for example, a relationship that the output objects are positioned in the same page in the document file 500. Therefore, the file control unit 110 edits the document file 500 so that the output object 510b and the output object 510g are positioned in the same page. Then, an edited document file 500a is displayed in the output side display region Ga22 as illustrated in FIG. 16.

FIG. 17 specifically illustrates a second example of the editing screen G20 after the document file 500 is edited. The second example is an example in which an editing arrow 320d connecting two pages of the document file 500 is input. Specifically, the editing arrow 320d connects the page 502 and the page 503, and indicates a relationship between the two pages. In a case in which the editing arrow 320d is input, the editing arrow 320d is displayed in the input side display region Ga21 as illustrated in FIG. 17. Further, in a case in which the editing arrow 320d is input, information indicating the relationship indicated by the editing arrow 320d is acquired by the acquiring unit 103. Then, the file control unit 110 edits the document file 500 on the basis of the information. The editing arrow 320d illustrated in FIG. 17 indicates, for example, an order relation. Specifically, the editing arrow 320d indicates an order relation that the page on the side indicated by the editing arrow 320d is later than the page on the other side. Therefore, the file control unit 110 edits the document file 500 so that the page 502 is positioned behind the page 503. Then, an edited document file 500b is displayed in the output side display region Ga22 as illustrated in FIG. 17.

As described above, the display control unit 107 causes an image in which the edge 420 of the DAG 400 is superimposed on the generated document file 500 and an input editing symbol to be displayed in the input side display region Ga21, and causes the edited document file 500 to be displayed in the output side display region Ga22. Accordingly, it is possible to present the editing process of the document file 500 to the user in real time.

Further, the editing the document file 500 by the file control unit 110 and the control of the display of the edited document file 500 by the display control unit 107 may be executed in accordance with an input manipulation of the user.

Further, the display control unit 107 may cause various kinds of information such as the relationship information and the attribute information to be displayed in the editing screen G20. For example, the display control unit 107 may cause the relationship information corresponding to each edge 420 to be displayed in the vicinity of each edge 420. Further, the display control unit 107 may cause the attribute information corresponding to each output object 510 to be displayed in the vicinity of each output object 510.

Further, in a state in which the editing screen G20 is displayed, the user may be able to update various kinds of information such as the relationship information or the attribute information. Information for updating various kinds of information such as the relationship information or the attribute information may be input by various manipulations using the input device of the information processing device 10. For example, the display control unit 107 may cause a menu for inputting such information to be displayed in the editing screen G20.

Further, in a state in which the editing screen G20 is displayed, the user may be able to update information indicating the output object 510 itself. Information for updating the information indicating the output object 510 itself may be input by various manipulations using the input device of the information processing device 10. For example, the display control unit 107 may cause a menu for inputting such information to be displayed in the editing screen G20. Further, as described with reference to FIG. 11 and FIG. 12, in a case in which the output object 510 is added by the file generating unit 115, the attribute information or the information indicating the output object 510 itself may be updatable for the added output object 510 as well.

Further, as described above, the editing symbol may indicate a relationship between different pages or a relationship between the output objects 510 belonging to different pages. Accordingly, it is possible to edit content over pages using the editing screen G20.

Further, the display control unit 107 may cause information indicating a difference between the generated document file 500 and the edited document file 500 to be displayed in the editing screen G20. Further, in a case in which the relationship information for a certain edge 420 is updated, the display control unit 107 may cause display of the edge 420 in the input side display region Ga21 to be different from display of the edge 420 in which the relationship information is not updated.

Further, in the above example, the image in which the edge 420 of the DAG 400 is superimposed on the generated document file 500 is displayed in the input side display region Ga21 has been described, but an image having another configuration may be displayed in the input side display region Ga21. For example, the DAG 400 itself including the node 410 and the edge 420 may be displayed in the input side display region Ga21.

Further, in a case in which it is detected that an input symbol or an editing symbol is input, the display control unit 107 controls display of a symbol and an object or a page of a target whose relationship is indicated by the symbol such that a notification of a detection result is given to the user. Further, in a case in which an input manipulation of the user is performed in accordance with the detection result, the acquiring unit 103 may acquire information indicating a relationship indicated by the symbol. Further, in a case in which pairs of a plurality of objects or pages are detected as the target, a notification of a detection result may be given to the user so that the user selects a pair of objects or pages intended as the target. In this case, the acquiring unit 103 acquires information indicating the relationship indicated by the symbol as information for the selected pair of objects or pages.

As described above, according to the present embodiment, the file control unit 110 generates the display information related to the display of the output object 510 including the position information indicating the position in the document file 500 of the output object 510 corresponds to the input object 310 on the basis of the relationship information indicating the relationship between a plurality of input objects 310 indicated by the symbols input by the user. Accordingly, for example, even in a case in which a file serving as a draft is temporarily generated, it is possible to reduce time and effort to input information in order to rearrange respective objects. Further, the display information can be generated by an intuitive input manipulation.

Therefore, even in a case in which the user is not accustomed to the generation of the display information, it is possible to reduce time and effort to input information. Thus, according to the present embodiment, it is possible to reduce time and effort to input information to generate desired display information. Therefore, it is possible to generate desired display information for an object in the document file more efficiently.

Further, as described above, according to the present embodiment, the file control unit 110 generates the DAG 400 by modeling the relationship between the plurality of input objects 310 indicated by the relationship information and generates the display information using the DAG 400. Accordingly, it is possible to calculate the weight of each edge 420 and quantitatively evaluate the relationship between a plurality of input objects 310.

Further, as described above, according to the present embodiment, the file control unit 110 generates the display information on the basis of the comparison result of the DAG 400 and the reference DAG 800 stored in advance. Accordingly, the weight of each edge 420 can be more appropriately calculated. Further, it is possible to effectively use the reference document file 900 associated with the reference DAG 800 in the display information generation process.

Further, as described above, according to the present embodiment, the file control unit 110 generates the display information on the basis of the reference document file 900 stored in advance in association with the reference DAG 800. Accordingly, the display information can be more likely to be generated.

[1-2. Operation]

Figure 18:
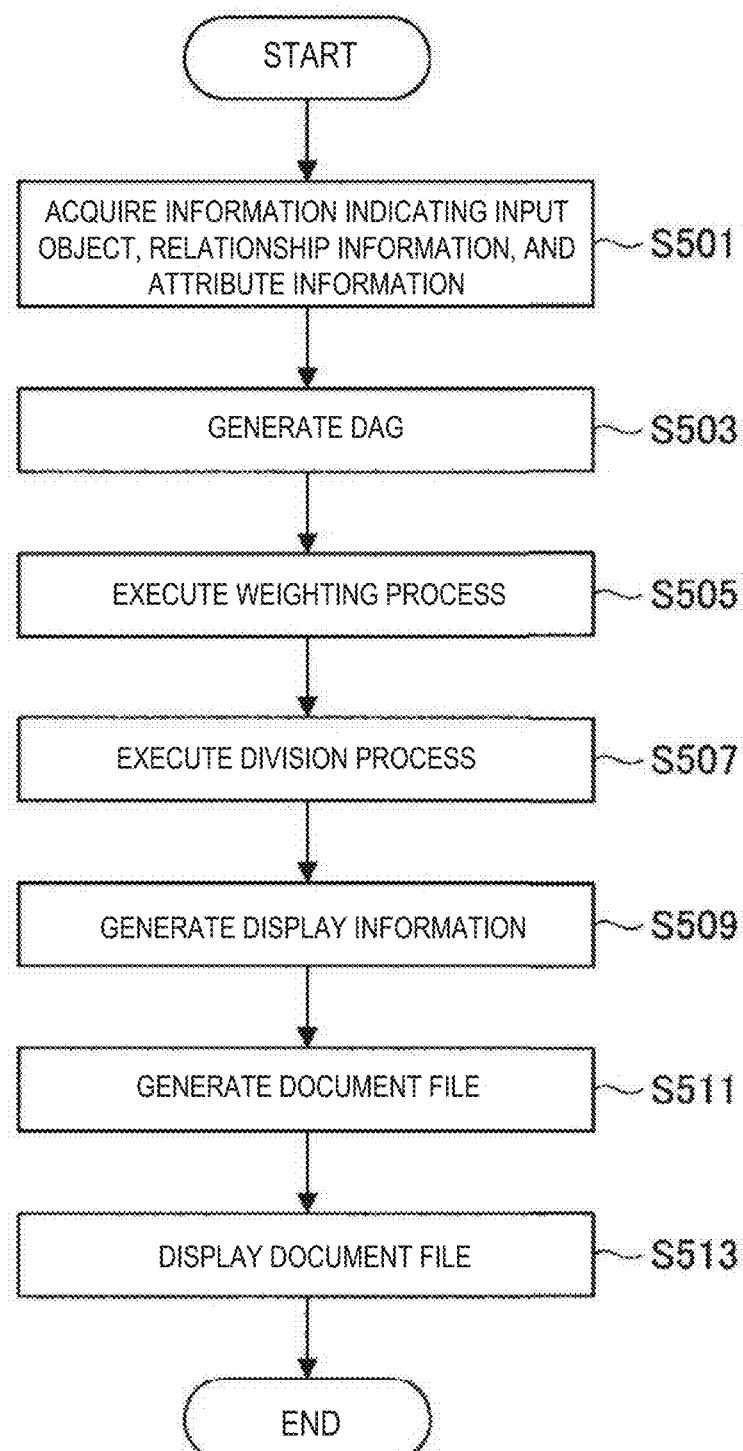
FIG. 18 is a flowchart illustrating an example of a flow of a process performed by an information processing device according to the embodiment.

Next, a flow of a process performed by the information processing device 10 according to the present embodiment will be described with reference to FIG. 18. FIG. 18 is a flowchart illustrating an example of a flow of a process performed by the information processing device 10 according to the present embodiment.

As illustrated in FIG. 18, first, the acquiring unit 103 acquires information indicating an input object, the relationship information, and the attribute information (step S501), and outputs such information to the file control unit 110 and the storage unit 101. Then, the DAG generating unit 111 generates the DAG 400 by modeling the relationship between a plurality of input objects 310 indicated by the relationship information (step S503), and outputs the information indicating the generated DAG 400 to the weighting unit 112. Then, the weighting unit 112 executes the weighting process for weighting each edge 420 of the DAG 400 (step S505), and outputs information indicating the DAG 400 after the weighting process to the dividing unit 113. Then, the dividing unit 113 executes the division process for dividing the DAG 400 after the weighting process into a plurality of partial regions (step S507), and outputs the DAG 400 after the division process to the display information generating unit 114 and the storage unit 101.

Then, the display information generating unit 114 generates the display information related to the display of the output object 510 in the document file 500 (step S509), and outputs the generated display information to the file generating unit 115. Next, the file generating unit 115 generates the document file 500 on the basis of the display information (step S511), and outputs the generated document file 500 to the display information generating unit 114, the display control unit 107, and the storage unit 101. Next, the display control unit 107 causes the display device to display the generated document file 500 (S513), and the process illustrated in FIG. 18 ends.

2. MODIFIED EXAMPLES

Next, various modified examples will be described with reference to FIGS. 19 to 23.

2-1. First Modified Example

Figure 19:
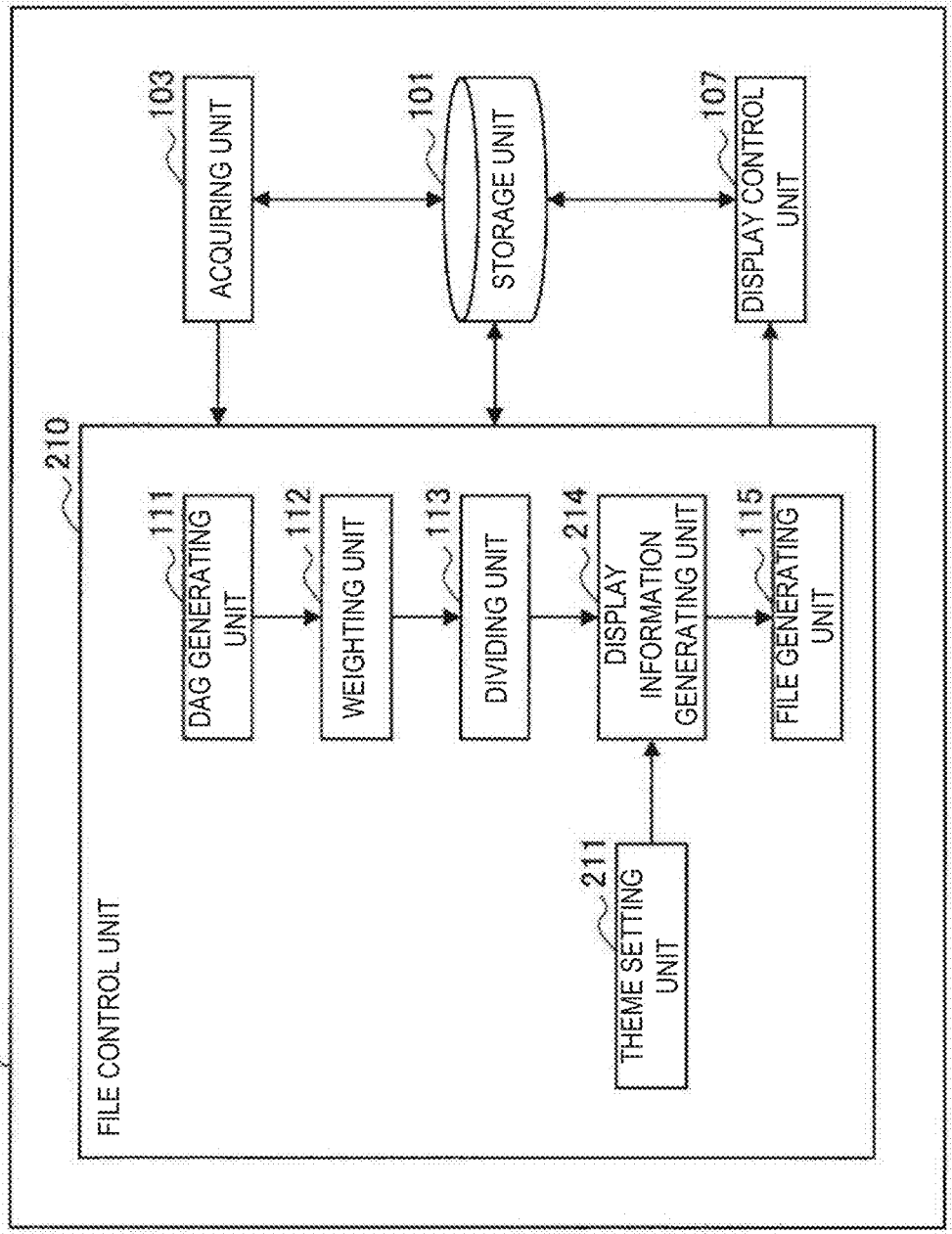
FIG. 19 is an explanatory diagram illustrating an example of a functional configuration of an information processing device according to a first modified example.

First, a first modified example will be described with reference to FIG. 19. FIG. 19 is an explanatory diagram illustrating an example of a functional configuration of an information processing device 20 according to the first modified example. The first modified example differs in that a file control unit 210 includes a theme setting unit 211 as compared with the information processing device 10 described with reference to FIG. 1. Further, in the first modified example, a display information generating unit 214 generates the display information on the basis of a theme set by the theme setting unit 211.

The theme setting unit 211 sets a theme of the document file 500. In a case in which the theme is set, the display information generating unit 214 generates the display information on the basis of the theme. The theme indicates an index related to display of each output object 510 in the document file 500 and is intended to improve a sense of unity of display of each output object 510. Specifically, the display information generating unit 214 generates the display information of each output object 510 so that the sense of unity of display of each output object 510 is improved on the basis of the index indicated by the set theme. As theme, various themes can be applied. For example, themes such as a Takahashi method style, a Steve Jobs style, a retro style, a classical style, and the like can be applied as the theme.

In a case in which the theme is set, for example, candidates may be set for an item corresponding to the theme among items related to the display. Then, the display information generating unit 214 generates the display information for the item by selecting it from among the candidates. For example, an example in which three candidates of 18 pixels, 24 pixels, and 32 pixels are set for the font size in a case in which a certain theme corresponds to a font size serving as the item, and the theme is set will be described. In this case, the display information generating unit 214 generates information indicating the font size by selecting it from among the three candidates. Further, in a case in which the theme is set, there may be items for which no candidates are set. For the items for which no candidates are set in a case in which the theme is set as described above, the display information generating unit 214 may generate the display information by performing a process similar to that in a case in which no theme is set. Further, in a case in which a plurality of themes is selected, the items for which candidates are set may correspond to different themes. For example, a dimension and a position which are items for which candidates are set may correspond to the Takahashi method style, while a color which is an item for which candidates are set may correspond to the retro style.

The theme setting unit 211 may set the theme on the basis of various information. The various information and a processing related to a setting of the theme based on the various information by the theme setting unit 211 will be described below.

For example, the theme setting unit 211 may set the theme on the basis of information related to content of the input object 310. For example, information indicating a tone of the words, a language, or a topic may be applied as the information. The tone of the words includes, for example, a tone of the words such as a tone of "desu/masu" and a tone of "dearu." The topic includes, for example, topics such as sales, accounting, and technology. Further, the information indicating a tone of the words, a language, or a topic may be acquired on the basis of, for example, information indicated by an input object 310 of text or handwriting stroke. Further, the information indicating the topic can be estimated on the basis of information indicated by the input object 310 of an image. Specifically, the topic can be estimated from the input object 310 of the image by performing an object recognition process using image processing. Further, in a case in which the input object 310 is an image on a web, the topic can be estimated from information indicating a posting source of the image. Further, the theme setting unit 211 may set the theme so that color information of each output object 510 is adjusted in accordance with a cultural zone corresponding to a language.

Further, the theme setting unit 211 may set the theme on the basis of information related to the user who is a creator of the document file 500. For example, information indicating an age, a sex, an associated organization, an occupation, a specialty area, or a taste may be applied as the information. The occupation or the specialty area includes, for example, a management, sales, an engineer, or the like. The information related to the user can be acquired on the basis of registration information to the information processing device 10. Further, the information related to the user can be acquired by prior learning. Further, the theme setting unit 211 may set the theme on the basis of information related to a generation location of the document file 500. The information can be acquired by using a global positioning system (GPS) receiver. Further, in a case in which a camera device is installed in the information processing device 10, the information can be acquired by estimating the generation location from an image captured by the camera device.

Further, the theme setting unit 211 may set the theme on the basis of information related to disclosure in a case in which the generated document file 500 is disclosed. For example, the theme setting unit 211 may set the theme on the basis of information related to a viewer of the document file 500. For example, information indicating an age, a sex, an associated organization, occupation, a specialty area, or a taste may be applied as the information. The information about the viewer can be acquired on the basis of registration information to the information processing device 10. Further, in a case in which a profile book of the viewer is stored in the information processing device 10, the information related to the viewer can be acquired using the profile book. Further, the information related to the viewer can be acquired by using a social networking service (SNS) in a case in which the document file 500 is disclosed via the Internet.

Further, the theme setting unit 211 may set the theme on the basis of information related to a disclosure location of the document file 500. For example, information indicating whether or not it is a region, a facility, or a web can be applied as the information. The region includes cities or the like of each country. Further, the information indicating the facility includes information indicating a size or a type of each facility. The information related to the disclosure location can be acquired on the basis of registration information to the information processing device 10. Further, in a case in which a calendar is stored in the information processing device 10, the information related to the disclosure location can be acquired using the calendar. Further, in a case in which the document file 500 is disclosed via the Internet, the information related to the disclosure location can be acquired by using the SNS. Further, the theme setting unit 211 may set the theme so that the display of each output object 510 is appropriately adjusted in accordance with a region serving as the disclosure location. Further, the theme setting unit 211 may set the theme so that a dimension of each output object 510 increases as the size of the facility serving as the disclosure location increases.

Further, the theme setting unit 211 may set the theme on the basis of information related to a disclosure date and time of the document file 500. The information related to the date and time can be acquired on the basis of registration information to the information processing device 10. Further, in a case in which a calendar is stored in the information processing device 10, the information related to the date and time can be acquired using the calendar. Further, in a case in which the document file 500 is disclosed via the Internet, the information related to the date and time can be acquired by using the SNS. Further, a theme corresponding to a date and time such as a summer style or a Halloween style may be applied as the theme corresponding to the date and time.

The theme setting unit 211 may decide a theme to be set using a plurality of types of information described above such as the information related to the content of the input object 310 and the information related to the user as a plurality of parameters.

For example, the theme setting unit 211 may decide the theme by using a prediction model which is learned in advance. Specifically, the theme setting unit 211 may calculate the likelihood of each theme using a prediction model which is learned in advance and decide a theme having the highest likelihood or a theme in which the likelihood is equal to or higher than a threshold value as the theme to be set. Here, the theme setting unit 211 may set the theme on the basis of an input manipulation of the user. Each of the above prediction models is constructed by using, for example, the setting result of the theme by the user in the past and a plurality of types of information such as the information related to the content of the input object 310 in the past, the information related to the user, and the like.

Further, a case in which a map indicating a correspondence relationship between each theme and a category is prepared in advance by assigning a category such as a work, a study session, a hobby, or the like to each theme, and the theme is decided using the map is considered. In this case, the theme setting unit 211 can decide the category by using the prediction model which is learned in advance and decide the theme with reference to the map. Further, a case in which for each theme, a map indicating a correspondence relation between each theme and an index value is prepared in advance by assigning a value indicating a degree of privacy, a degree of difficulty, or the like to each theme as index value, and the theme is decided using the map is considered. In this case, the theme setting unit 211 can calculate the index value by using the prediction model which is learned in advance and decide the theme with reference to the map.

The theme setting unit 211 may set a plurality of themes in a case in which a plurality of theme candidates is extracted. Here, a priority may be set for each theme. The priority may be set in advance. Further, the likelihood of each theme which can be calculated by using a prediction model which is learned in advance may be set as the priority. For example, the priority of each theme may differ in accordance with each item related to a display, and the theme setting unit 211 may preferentially set a theme with higher priority for each item.

Further, in a case in which a plurality of theme candidates is extracted, the theme setting unit 211 may select one theme from a plurality of theme candidates and set it. For example, the theme setting unit 211 may preferentially set a theme with a higher priority. Further, the information processing device 10 may cause a menu for selecting one theme from a plurality of theme candidates to be displayed or may set the theme in accordance with a manipulation of the user using the menu.

As described above, specifically, the reference information is used in the display information generation process performed by the display information generating unit 214. A plurality of pieces of information may be used as the reference information. In the first modified example, the display information generating unit 214 may use only the reference information having the reference document file 900 relatively closer to the theme in which the display of the object 910 is set among a plurality of pieces of reference information in the display information generation process. In this case, no candidate is set for the item corresponding to the set theme.

Further, the display information generating unit 214 may generate the candidate of the display information for each reference information by using each of a plurality of pieces of reference information, preferentially select a candidate closer to the theme in which the display of the corresponding output object 510 is set from among a plurality of generated display information candidates, and decide it as the display information. Further, in this case, the display information generating unit 214 may not use the reference information having the reference document file 900 which is significantly different from the theme in which the display of the object 910 is set among a plurality of pieces of reference information in the display information generation process.

Further, the display information generating unit 214 may select the display information on the basis of the attribute information for the node 410 of the DAG 400 from the candidates for the item corresponding to the set theme. For example, in a case in which a plurality of candidates for the dimension serving as the above item are set, when the degree of importance indicated by the attribute information is 5 out of 5 steps, the display information generating unit 214 generates dimension information indicating the largest dimension among the candidates. On the other hand, in this case, the display information generating unit 214 generates dimension information indicating the smallest dimension among the candidates in a case in which the degree of importance indicated by the attribute information is 1 out of 5 steps. Further, in a case in which the theme is not set, the display information generating unit 214 may generate dimension information indicating a dimension which is as twice as the dimension of the input object 310 in a case in which the degree of importance indicated by the attribute information is 5 out of 5 steps. On the other hand, in this case, the display information generating unit 214 may generate dimension information indicating a dimension which is as half as the dimension of the input object 310 in a case in which the degree of importance indicated by the attribute information is 1 out of 5 steps. Further, in a case in which an item corresponding to the set theme is color, the display information generating unit 214 may select a candidate corresponding to a color corresponding to the degree of importance indicated by the attribute information and generate color information indicating the color.

2-2. Second Modified Example

Figure 20:
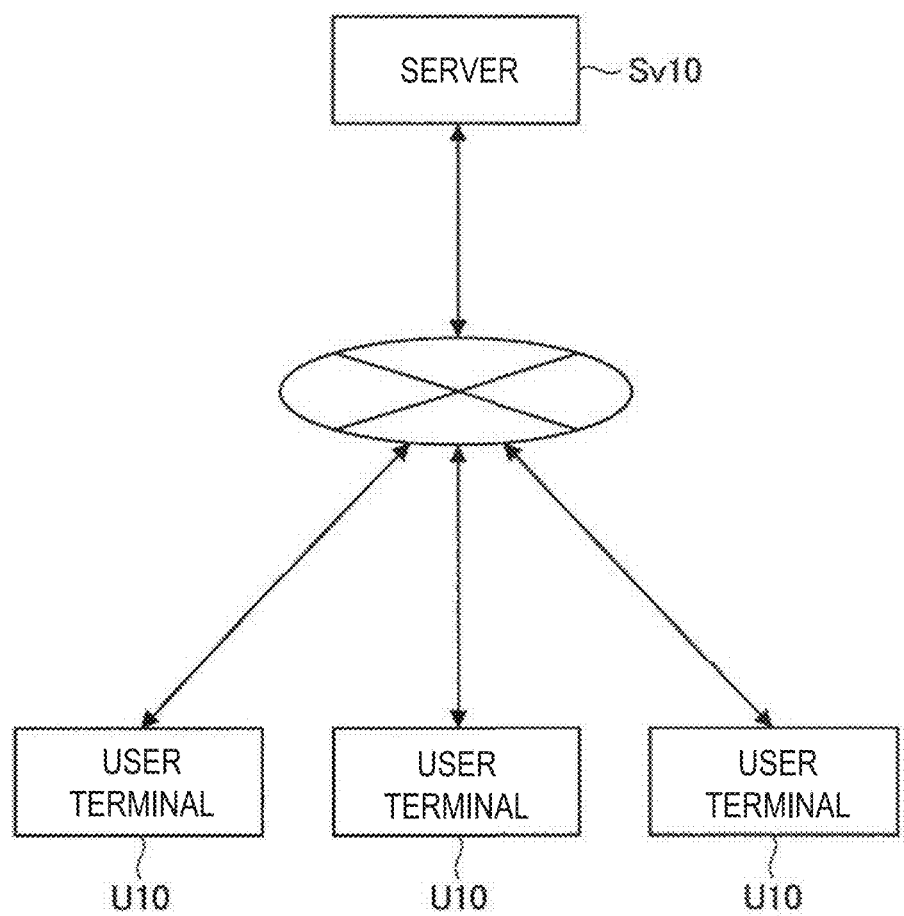
FIG. 20 is an explanatory diagram illustrating an example of a schematic configuration of an information processing system according to a second modified example.

Next, a second modified example will be described with reference to FIGS. 20 and 21. The second modified example is an example in which the information processing device according to the present disclosure is implemented as a user terminal U10 with a communication function constituting an information processing system 1. FIG. 20 is an explanatory diagram illustrating an example of a schematic configuration of the information processing system 1 in accordance with the second modified example. As illustrated in FIG. 20, the information processing system 1 includes a server Sv10 and a plurality of user terminals U10. The server Sv10 and a plurality of the user terminals U10 are communicably connected to each other via a wired or wireless information network. Further, the number of servers Sv10 and the number of user terminals U10 illustrated in FIG. 20 are merely examples.

Figure 21:
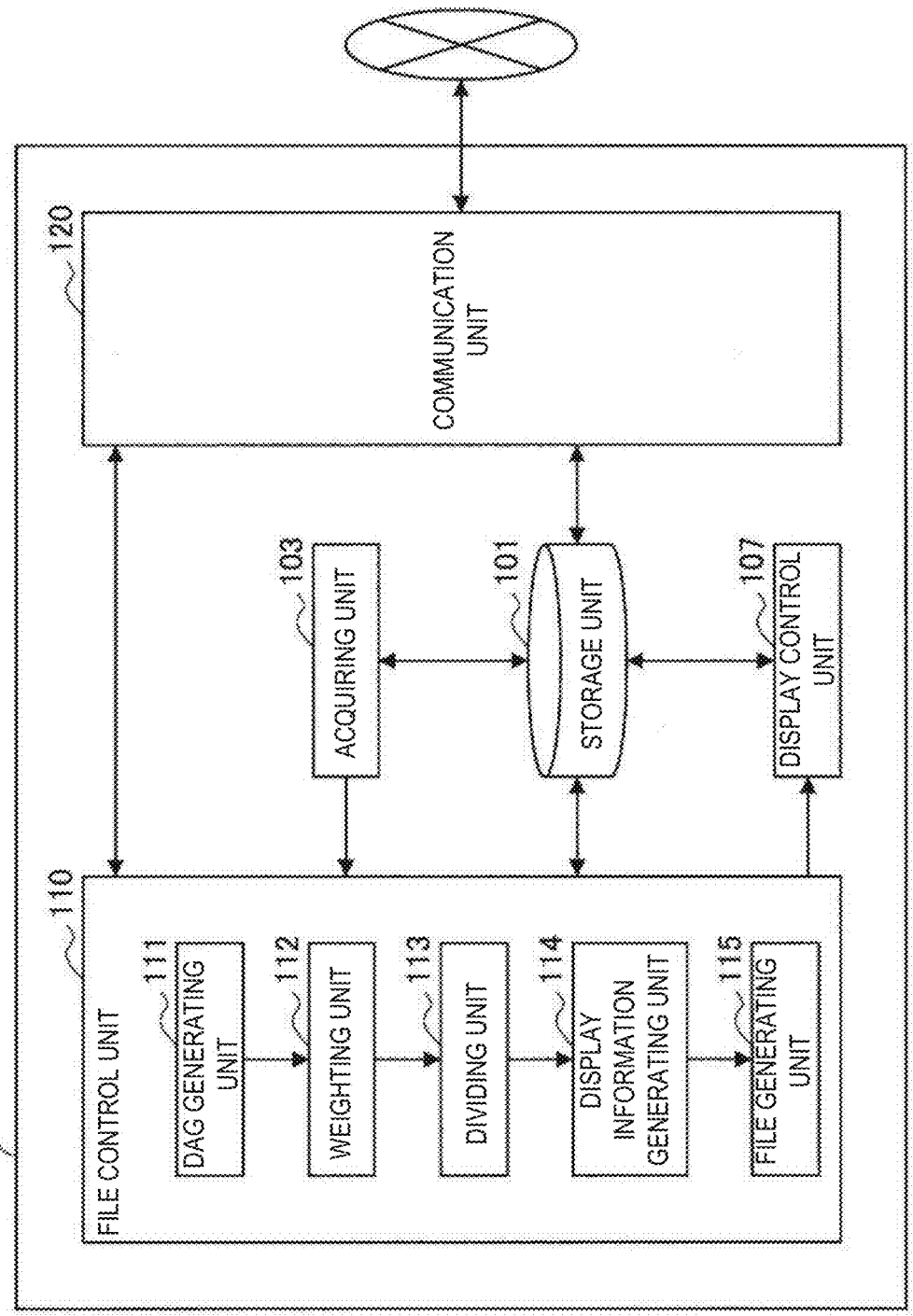
FIG. 21 is an explanatory diagram illustrating an example of a functional configuration of a user terminal according to the second modified example.

FIG. 21 is an explanatory diagram illustrating an example of a functional configuration of the user terminal U10 according to the second modified example. As illustrated in FIG. 21, unlike the information processing device 10 illustrated in FIG. 1, the user terminal U10 according to the second modified example includes a communication unit 120. The communication unit 120 communicates with an external device. Specifically, the communication unit 120 communicates with the server Sv10.

The communication unit 120 may associate the DAG 400 and the document file 500 output from the file control unit 110 and then transmit the DAG 400 and the document file 500 to the server Sv10. Further, the communication unit 120 may acquire a pair of the DAG 400 and the document file 500 from the storage unit 101 and transmit the pair to the server Sv10. The server Sv10 includes a storage device and causes the received pair of the DAG 400 and the document file 500 to be stored in the storage device. As described above, the pair of the DAG 400 and the document file 500 generated by each user terminal U10 can be stored in the server Sv10.

Further, the communication unit 120 may receive the pair of the DAG 400 and the document file 500 stored in the server Sv10 from the server Sv10. The communication unit 120 outputs the received pair to the file control unit 110 and the storage unit 101. The pair is used as the reference information in the weighting process or the display information generation process performed by the file control unit 110.

As described above, according to the second modified example, the user terminal U10 can communicate with the server Sv10. Accordingly, a pair of the DAG 400 and the document file 500 generated by each user terminal U10 can be stored in the server Sv10. Such a pair can be used as the reference information by each user terminal U10. Therefore, each user terminal U10 can use the pair of the DAG 400 and the document file 500 generated by another user terminal U10 as the reference information.

Further, each user terminal U10 may selectively use the reference information on the basis of various kinds of information in a process executed by each user terminal U10. Here, a case in which information related to each piece of reference information is added to each piece of reference information is considered. For example, the information related to the creator of the document file 500 or the information related to the disclosure of the document file 500 can be applied as the information related to each piece of reference information. In this case, each user terminal U10 may appropriately select the reference information to be used on the basis of the information related to each piece of reference information.

Further, in the information processing system 1, the reference information can be shared by each user who uses each user terminal U10. Here, the information processing system 1 may be configured so that a point indicating an evaluation value is assigned to each piece of shared reference information by each user. For example, each user inputs information indicating a point for each piece of reference information to each user terminal U10. Then, information indicating the point is transmitted from each user terminal U10 to the server Sv10 and managed by the server Sv10. In the server Sv10, each piece of reference information and each point are associated and stored. Accordingly, each user terminal U10 can acquire the information indicating the point for each piece of reference information with reference to such information stored in the server Sv10. Each user terminal U10 may selectively use the reference information on the basis of the point in the process executed by each user terminal U10. For example, each user terminal U10 may preferentially use the reference information with a high point.

2-3. Third Modified Example

Figure 22:
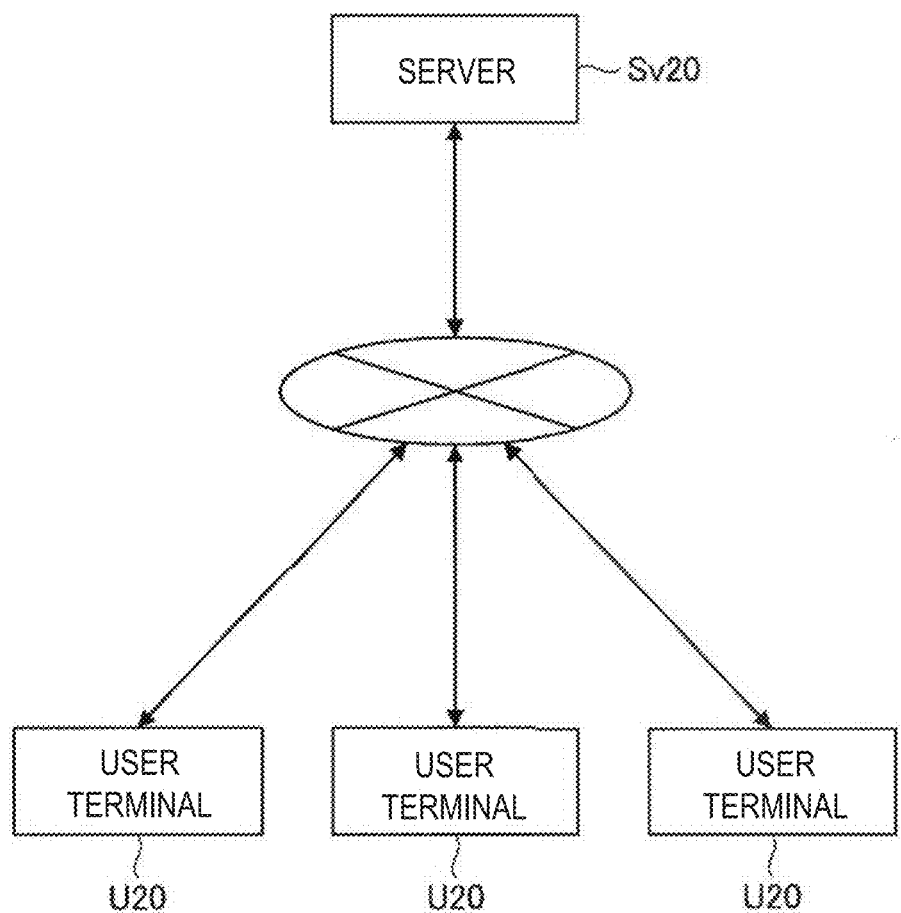
FIG. 22 is an explanatory diagram illustrating an example of a schematic configuration of an information processing system according to a third modified example.

Next, a third modified example will be described with reference to FIGS. 22 and 23. The third modified example is an example in which the information processing device according to the present disclosure is implemented as a server Sv20 with a communication function constituting an information processing system 2. FIG. 22 is an explanatory diagram illustrating an example of a schematic configuration of the information processing system 2 in accordance with the third modified example. As illustrated in FIG. 22, the information processing system 2 includes a server Sv20 and a plurality of user terminals U20. The server Sv20 and a plurality of the user terminals U20 are communicably connected to each other via a wired or wireless information network. Further, the number of servers Sv20 and the number of user terminals U20 illustrated in FIG. 22 are merely examples.

In the information processing system 2, the user terminal U20 has a function of displaying an image and a function of receiving an input of the user. The above functions of the user terminal U20 is realized by a device such as, for example, a personal computer, a smartphone or a tablet terminal. The user terminal U20 may transmit information input from the user to the server Sv20. Further, the user terminal U20 can receive information from the server Sv20 and display the received information.

Figure 23:
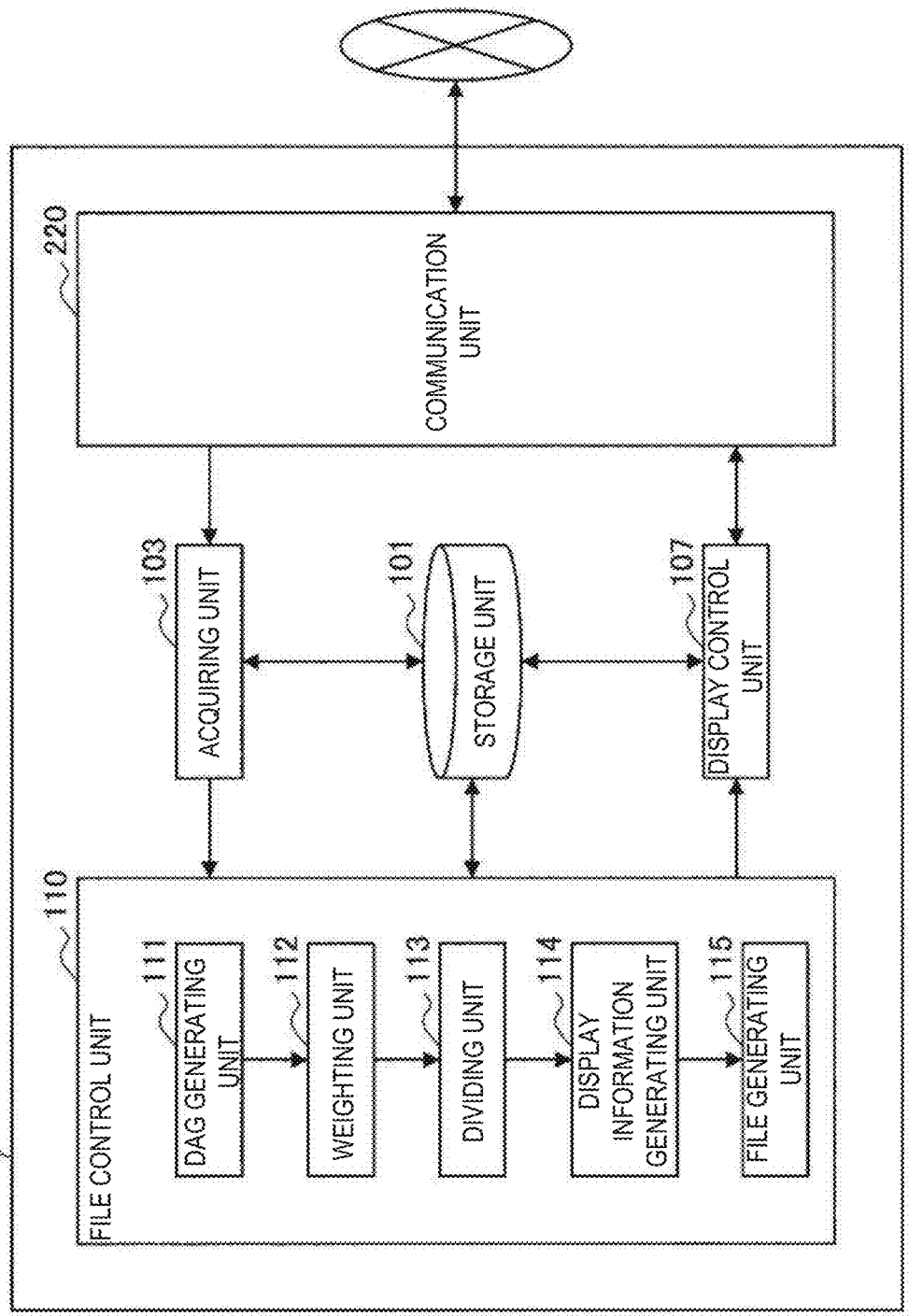
FIG. 23 is an explanatory diagram illustrating an example of a functional configuration of a server according to the third modified example.

FIG. 23 is an explanatory diagram illustrating an example of a functional configuration of the server Sv20 according to the third modified example. As illustrated in FIG. 23, unlike the information processing device 10 illustrated in FIG. 1, the server Sv20 according to the third modified example includes a communication unit 220. The communication unit 220 communicates with an external device. Specifically, the communication unit 220 communicates with each user terminal U20.

The communication unit 220 receives the information input by the user from the user terminal U20 and outputs the information to the acquiring unit 103. Accordingly, the acquiring unit 103 can acquire the information indicating the input object 310, the relationship information, and the attribute information as information mainly used in the document file generation process performed by the file control unit 110.

Further, the communication unit 220 transmits a control command for causing various screens output from the display control unit 107 to be displayed to the user terminal U20. Accordingly, the display of the screen by each user terminal U20 is controlled.

As described above, the information processing device according to the present disclosure can be implemented as the communicable server Sv20 constituting the information processing system 2. In this case, it is possible to obtain effects similar to those in a case in which the information processing device according to the present disclosure is implemented as the user terminal.

3. HARDWARE CONFIGURATION

The embodiment of the present disclosure has been described above. The above-described process by the information processing device 10 is realized by cooperation of software and hardware of the information processing device 10 to be described below.

Figure 24:
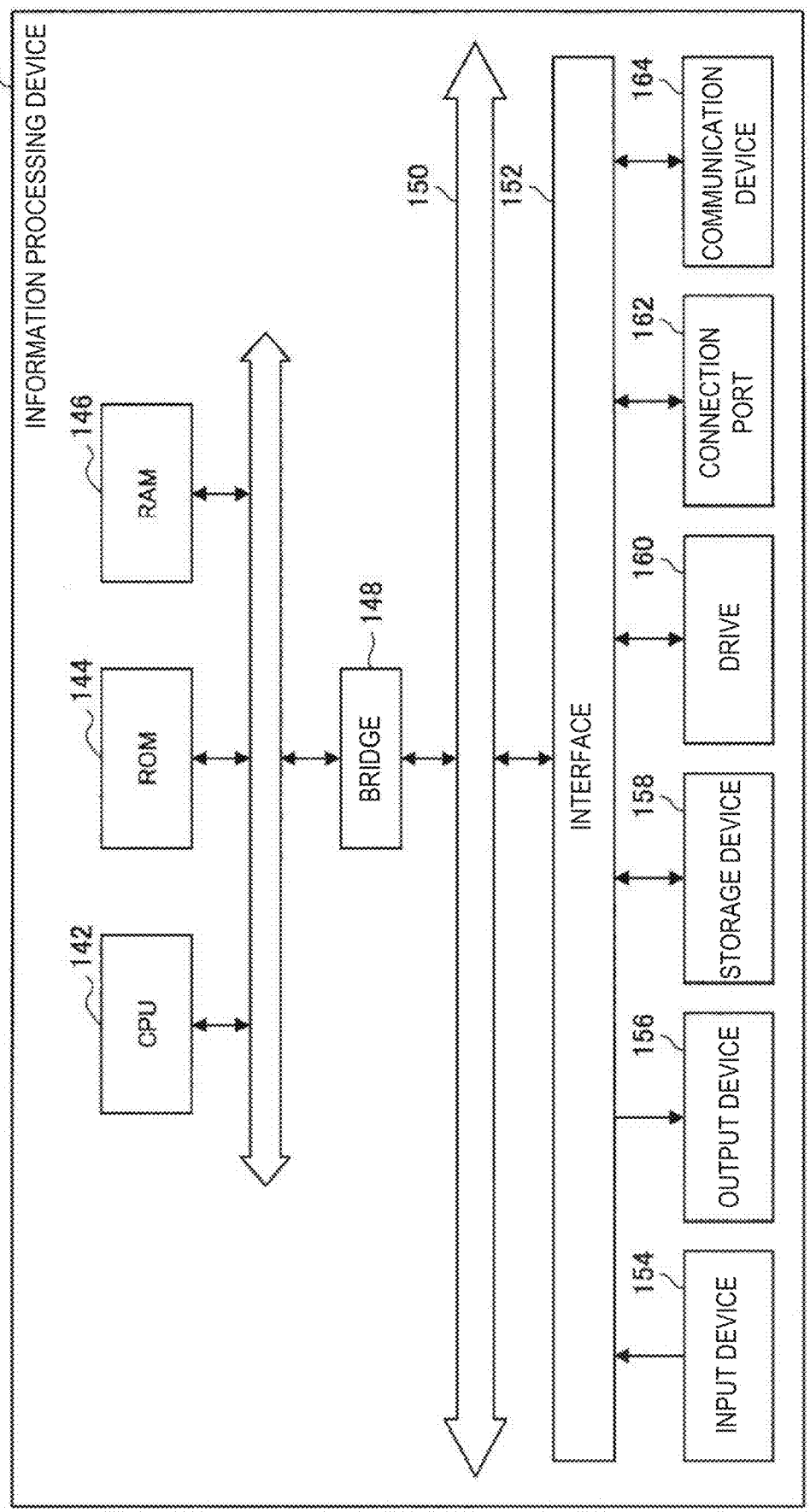
FIG. 24 is an explanatory diagram illustrating an example of a hardware configuration of an information processing device according to the present disclosure.

FIG. 24 is an explanatory diagram illustrating an example of a hardware configuration of the information processing device 10 according to the present disclosure. As illustrated in FIG. 24, the information processing device 10 includes a central processing unit (CPU) 142, a read-only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing device and a control device, and realizes an operation of each functional configuration in the information processing device 10 in cooperation with various programs. Moreover, the CPU 142 may be a microprocessor. The ROM 144 stores arithmetic parameters, a program, and the like to be used by the CPU 142. The RAM 146 temporarily stores a program to be used for execution by the CPU 142 and parameters or the like appropriately changed in the execution. The CPU 142, the ROM 144, and the RAM 146 are connected to each other by an internal bus including a CPU bus.

The input device 154 is, for example, input means such as a mouse, a keyboard, a touch panel, a button, a microphone, a switch, and a lever used for an operator to input information and includes an input control circuit that generates an input signal on the basis of an input by the operator and outputs the input signal to the CPU 142. The operator of the information processing device 10 can instruct the information processing device 10 to input various kinds of data and perform a processing operation by manipulating the input device 154.

The output device 156 performs outputting to, for example, a device such as a liquid crystal display (LCD) device, an organic light-emitting diode (OLED) device, or a lamp. Further, the output device 156 may output sounds of a speaker, a headphone, and the like.

The storage device 158 is a data storage device. The storage device 158 may include a storage medium, a recording device that records data on the storage medium, a reading device that reads the data from the storage medium, and an erasure device that erases the data recorded on the storage medium. The storage device 158 stores various kinds of data or a program to be executed by the CPU 142.

The drive 160 is a storage medium reader and writer and is contained in the information processing device 10 or is externally attached. The drive 160 reads information recorded on a mounted magnetic disk, optical disc, magneto-optical disc, or removable storage medium such as a semiconductor memory and outputs the information to the RAM 146. Moreover, the drive 160 can also write information on the removable storage medium.

The connection port 162 is, for example, a bus for connection with an external information processing device or a peripheral device of the information processing device 10. Moreover, the connection port 162 may be a universal serial bus (USB).

The communication device 164 is, for example, a communication interface including a communication device for connection to a network. Moreover, the communication device 164 may be an infrared communication-compatible device, a wireless Local Area Network (LAN)-compatible communication device, a Long Term Evolution (LTE)-compatible communication device, or a wired communication device performing wired communication.

It is possible to create a computer program for realizing the aforementioned respective functions of the information processing device 10 according to the embodiment and to install the computer program on the PC or the like. The information processing device 10 according to the embodiment can correspond to the computer according to the present disclosure. In addition, it is possible to provide a computer readable recording medium in which such a computer program is stored. The recording medium is, for example, a magnetic disk, an optical disc, a magneto-optical disc, a flash memory, or the like. In addition, the above computer program may be distributed via a network, for example, without using the recording medium. Also, the respective functions of the information processing device 10 according to the embodiment may be divided by a plurality of computers, and in that case, the respective functions that the plurality of computers have can be realized by the above computer program. The plurality of computers or a single computer having the functions of the information processing device 10 according to the present embodiment correspond to a computer system according to the present disclosure.

4. CONCLUSION

As described above, according to an embodiment of the present disclosure, the display information related to the display of the second object including the position information indicating the position in the document file of the second object corresponds to the first object is generated on the basis of the relationship information indicating the relationship between a plurality of first objects indicated by the symbols input by the user. Accordingly, for example, even in a case in which a file serving as a draft is temporarily generated, it is possible to reduce time and effort to input information in order to rearrange respective objects. Further, the display information can be generated by an intuitive input manipulation. Therefore, even in a case in which the user is not accustomed to the generation of the display information, it is possible to reduce time and effort to input information. Thus, according to the present embodiment, it is possible to reduce time and effort to input information to generate desired display information. Therefore, it is possible to generate desired display information for an object in the document file more efficiently.

Further, the example in which the acquisition of the relationship information by the acquiring unit 103 is realized by inputting the input symbol by the user has been described above, but the acquisition of the relationship information by the acquiring unit 103 may be realized by other methods as well. For example, the acquiring unit 103 may acquire the relationship information related to the order on the basis of a position of the input object 310 in the input window W10 or a time at which the input object 310 is generated. Further, the relationship information related to the order can be input such that two input objects 310 are sequentially selected by a manipulation such as click, touch, or the like. Further, various kinds of relationship information may be input by a manipulation using the menu displayed on the display device. The information processing device 10 may cause the display device to display the menu used when the user inputs various kinds of relationship information.

In addition, the series of control processes by each device described in the present specification may be realized using one of software, hardware, and a combination of the software and the hardware. For example, a program including the software is stored in advance on a storage medium (non-transitory media) provided internally or externally in each device. Then, for example, each program is read to the RAM at the time of execution and is executed by a processor such as the CPU. One processor or a plurality of processors may be provided to execute the respective programs.

Moreover, the process described using the flowchart in the present specification may not necessarily be performed in the order shown in the flowchart. Several processing steps may be performed in parallel. Moreover, additional processing steps may be adopted or some of the processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

an acquiring unit configured to acquire relationship information indicating a relationship between a plurality of first objects indicated by symbols input by a user; and a file control unit configured to generate display information related to display of second objects including position information indicating positions of the second objects corresponding to the first objects in a document file on the basis of the relationship information.

(2)

The information processing device according to (1), in which the symbols are input by handwriting manipulations.

(3)

The information processing device according to (1) or (2), in which the file control unit generates a directed acyclic graph by modeling the relationship between the plurality of first objects indicated by the relationship information and generates the display information using the directed acyclic graph.

(4)

The information processing device according to (3), in which the file control unit generates the display information on the basis of a comparison result of the directed acyclic graph and a reference directed acyclic graph stored in advance.

(5)

The information processing device according to (4), in which the file control unit generates the display information on the basis of a reference document file which is stored in advance in association with the reference directed acyclic graph.

(6)

The information processing device according to any one of (3) to (5), in which the file control unit generates the document file on the basis of the display information, and the information processing device includes a display control unit configured to control display of the document file.

(7)

The information processing device according to (6), in which the display control unit controls display of a screen including an input side display region in which information input for generating or editing the document file is displayed and an output side display region in which the generated or edited document file is displayed.

(8)

The information processing device according to (7), in which information input for generating the document file is displayed in the input side display region, and the display control unit causes the plurality of first objects and the input symbols to be displayed in the input side display region.

(9)

The information processing device according to (7) or (8), in which information input for editing the document file is displayed in the input side display region, and the display control unit causes an image in which an edge of the directed acyclic graph is superimposed on the document file and an input second symbol to be displayed in the input side display region in a case in which the symbols are first symbols.

(10)

The information processing device according to any one of (6) to (9), in which the file control unit adds the second objects to the document file on the basis of the relationship information.

(11)

The information processing device according to any one of (6) to (10), in which the file control unit generates a plurality of the document files.

(12)

The information processing device according to any one of (1) to (11), in which the acquiring unit acquires attribute information indicating attributes of the first objects, and the file control unit generates the display information on the basis of the attribute information.

(13)

The information processing device according to any one of (1) to (12), in which the position information includes page information indicating a page in which the second object is positioned in the document file.

(14)

The information processing device according to any one of (1) to (13), in which the display information includes dimension information indicating a dimension of the second object.

(15)

The information processing device according to any one of (1) to (14), in which the display information includes color information indicating a color of the second object.

(16)

The information processing device according to any one of (1) to (15), including a theme setting unit configured to set a theme of the document file, in which the file control unit generates the display information on the basis of the theme.

(17)

An information processing method, including:

acquiring relationship information indicating a relationship between a plurality of first objects indicated by symbols input by a user; and generating, by an information processing device, display information related to display of second objects including position information indicating positions of the second objects corresponding to the first objects in a document file on the basis of the relationship information.

(18)

A program causing a computer to function as:

an acquiring unit configured to acquire relationship information indicating a relationship between a plurality of first objects indicated by symbols input by a user; and a file control unit configured to generate display information related to display of second objects including position information indicating positions of the second objects corresponding to the first objects in a document file on the basis of the relationship information.

REFERENCE SIGNS LIST 1, 2 information processing system
10, 20 information processing device
101 storage unit
103 acquiring unit
107 display control unit
110, 210 file control unit
111 DAG generating unit
112 weighting unit
113 dividing unit
114, 214 display information generating unit
115 file generating unit
120, 220 communication unit
142 CPU
144 ROM
146 RAM
148 bridge
150 bus
152 interface
154 input device
156 output device
158 storage device
160 drive
162 connection port
164 communication device
211 theme setting unit
310 input object
320 arrow
401, 402, 403 partial region 410 node
420 edge
500 document file
501, 502, 503 page
510 output object
801, 802 partial region
810 node
820 edge
900 reference document file
901, 902 page
910 object

The invention claimed is:

1. An information processing device, comprising:
an acquiring unit configured to acquire relationship information indicating a relationship between a plurality of first objects, wherein
the relationship is indicated based on symbols input between the plurality of first objects, and
the symbols are input based on a user operation; and
a file control unit configured to:
generate a directed acyclic graph based on modeling of the relationship between the plurality of first objects; and
generate display information based on a comparison result of the directed acyclic graph and a reference directed acyclic graph, wherein
the display information is associated with display of a plurality of second objects,
the display information includes position information indicating positions of the plurality of second objects corresponding to the plurality of first objects in a document file, and
the position information is based on the relationship information.

2. The information processing device according to claim 1, wherein the symbols are input based on handwriting manipulations associated with the user operation.

3. The information processing device according to claim 1, wherein the file control unit is further configured to generate the display information based on a reference document file, wherein the reference document file is associated with the reference directed acyclic graph.

4. The information processing device according to claim 1, wherein the file control unit is further configured to generate the document file based on the display information, and
the information processing device further comprises a display control unit configured to control display of the document file.

5. The information processing device according to claim 4, wherein
the display control unit is further configured to control display of a screen including an input side display region and an output side display region,
the input side display region is configured to display information input for one of the generation of the document file or an editing operation of the document file, and
the output side display region is configured to display one of the generated document file or the edited document file.

6. The information processing device according to claim 5, wherein
the display control unit is further configured to control display of the plurality of first objects and the input symbols in the input side display region.

7. The information processing device according to claim 5, wherein the display control unit is further configured to:
control display of an image in which an edge of the directed acyclic graph is superimposed on the document file; and
control display of an input second symbol in the input side display region based on the symbols as first symbols.

8. The information processing device according to claim 4, wherein the file control unit is further configured to add the plurality of second objects to the document file based on the relationship information.

9. The information processing device according to claim 4, wherein the file control unit is further configured to generate a plurality of the document files.

10. The information processing device according to claim 1, wherein
the acquiring unit is further configured to acquire attribute information indicating attributes of the first objects, and
the file control unit is further configured to generate the display information based on the acquired attribute information.

11. The information processing device according to claim 1, wherein the position information includes page information indicating a page in which the plurality of second objects is positioned in the document file.

12. The information processing device according to claim 1, wherein the display information includes dimension information indicating a dimension of each of the plurality of second objects.

13. The information processing device according to claim 1, wherein the display information includes color information indicating a color of each of the plurality of second objects.

14. The information processing device according to claim 1, comprising a theme setting unit configured to set a theme of the document file, wherein the file control unit is further configured to generate the display information based on the theme.

15. An information processing method, comprising:
acquiring, by an information processing device, relationship information indicating a relationship between a plurality of first objects, wherein
the relationship is indicated based on symbols input between the plurality of first objects, and
the symbols are input based on a user operation; and
generating, by the information processing device, a directed acyclic graph based on modeling of the relationship between the plurality of first objects; and
generating, by the information processing device, display information based on a comparison result of the directed acyclic graph and a reference directed acyclic graph, wherein
the display information is associated with display of a plurality of second objects,
the display information includes position information indicating positions of the plurality of second objects corresponding to the plurality of first objects in a document file, and
the position information is based on the relationship information.

16. A non-transitory computer-readable medium having stored thereon, computer-executable instructions which, when executed by a computer, cause the computer to execute operations, the operations comprising:
acquiring relationship information indicating a relationship between a plurality of first objects, wherein the relationship is indicated based on symbols input between the plurality of first objects, and the symbols are input based on a user operation; and generating a directed acyclic graph based on modeling of the relationship between the plurality of first objects; and generating display information based on a comparison result of the directed acyclic graph and a reference directed acyclic graph, wherein the display information is associated with display of a plurality of second objects, the display information includes position information indicating positions of the plurality of second objects corresponding to the plurality of first objects in a document file, and the position information is based on the relationship information.

17. An information processing device, comprising:

an acquiring unit configured to acquire relationship information indicating a relationship between a plurality of first objects, wherein the relationship is indicated based on symbols input between the plurality of first objects, and the symbols are input based on a user operation;

a file control unit configured to:

generate a directed acyclic graph based on modeling of the relationship between the plurality of first objects;

generate display information based on the directed acyclic graph, wherein the display information is associated with display of a plurality of second objects, the display information includes position information indicating positions of the plurality of second objects corresponding to the plurality of first objects in a document file, and the position information is based on the relationship information; and generate the document file based on the display information; and a display control unit configured to:

control display of the document file; and control display of a screen including an input side display region and an output side display region, wherein the input side display region is configured to display information input for one of generation of the document file or an editing operation of the document file, and the output side display region is configured to display one of the generated document file or the edited document file.

* * * * *